(12) United States Patent
Nakamura

(10) Patent No.: US 8,228,436 B2
(45) Date of Patent: Jul. 24, 2012

(54) IMAGE SYNTHESIZING APPARATUS

(75) Inventor: Sensaburo Nakamura, Shizuoka (JP)

(73) Assignee: Sony Corporation, Tokyo (JP)

( * ) Notice: Subject to any disclaimer, the term of this patent is extended or adjusted under 35 U.S.C. 154(b) by 1328 days.

(21) Appl. No.: 11/906,900

(22) Filed: Oct. 4, 2007

(65) Prior Publication Data
US 2008/0084504 A1 Apr. 10, 2008

(30) Foreign Application Priority Data
Oct. 6, 2006 (JP) ................. P2006-275321

(51) Int. Cl.
*H04N 9/74* (2006.01)
*G06F 3/00* (2006.01)

(52) U.S. Cl. ......... 348/590; 348/578; 348/584; 715/723

(58) Field of Classification Search .......... 348/584–590, 348/722; 715/723
See application file for complete search history.

(56) References Cited

U.S. PATENT DOCUMENTS

| | | | | |
|---|---|---|---|---|
| 5,995,505 A | * | 11/1999 | Nakasaka et al. | 370/360 |
| 6,452,612 B1 | * | 9/2002 | Holtz et al. | 715/723 |
| 2003/0117431 A1 | * | 6/2003 | Moriwake et al. | 345/723 |
| 2005/0030432 A1 | * | 2/2005 | Ross et al. | 348/705 |
| 2007/0140666 A1 | * | 6/2007 | Higashi et al. | 386/122 |

FOREIGN PATENT DOCUMENTS

| | | |
|---|---|---|
| JP | 3-224370 | 10/1991 |
| JP | 6-237416 | 8/1994 |
| JP | 7-170453 | 7/1995 |
| JP | 11-331700 | 11/1999 |
| JP | 2002 185851 | 6/2002 |

* cited by examiner

*Primary Examiner* — Kristine Kincaid
*Assistant Examiner* — Omar S Parra
(74) *Attorney, Agent, or Firm* — Frommer Lawrence & Haug LLP; William S. Frommer; Thomas F. Presson

(57) ABSTRACT

An image synthesizing apparatus is provided. The image synthesizing apparatus includes: a key image selector, a background selector, a key processor, an image synthesizer, a frame memory, a part designator, and a writing device. In the image synthesizing apparatus, the image signal that has been selected by the key image selector is sent to the key processor, the image signal that has been processed by the key processor is sent to the writing device and written into the frame memory, and image signals read from every storage region of the frame memory are sent to the image synthesizer.

15 Claims, 23 Drawing Sheets

FIG. 4A
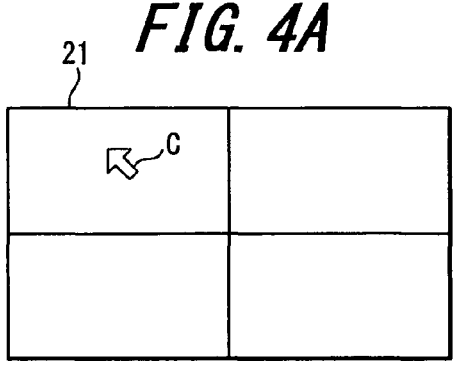
FIG. 4B
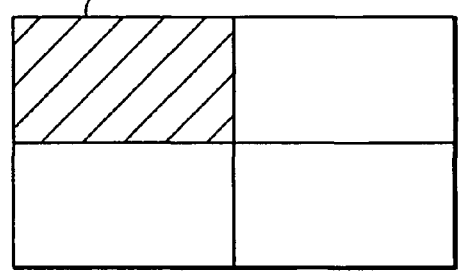
FIG. 4C
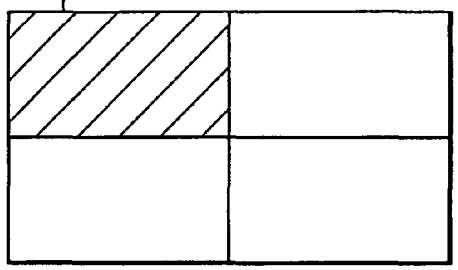
FIG. 4D
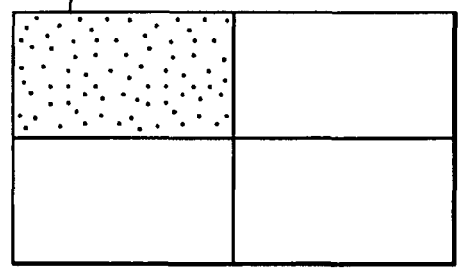
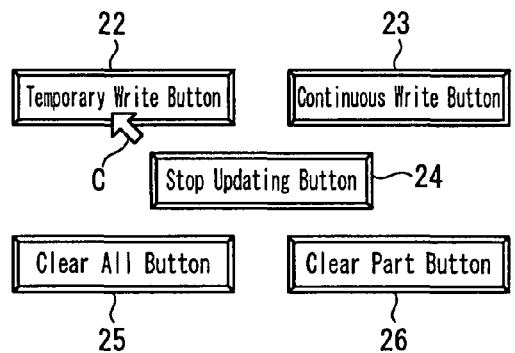
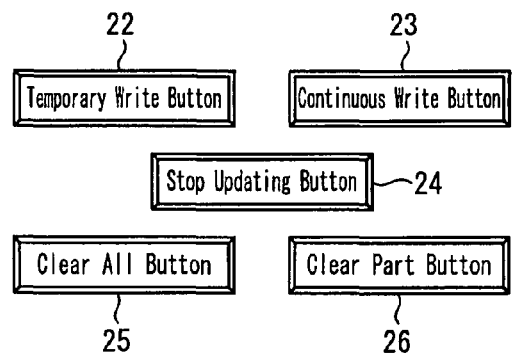
FIG. 4E
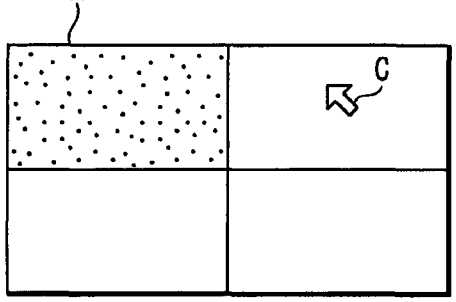
FIG. 4F
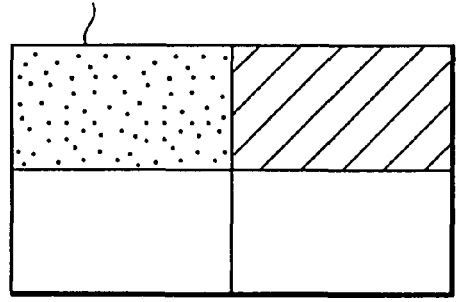

FIG. 8A
12　　　　　　　14　　　　　　　17
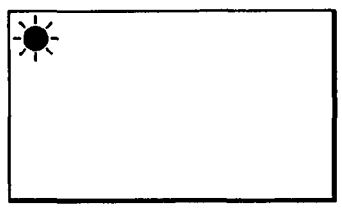 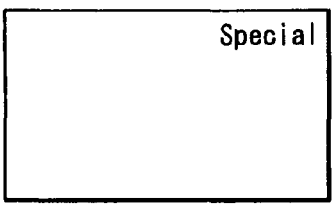 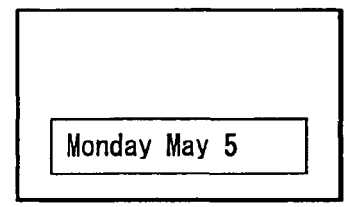
FIG. 8B
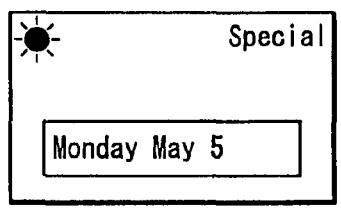
FIG. 8C
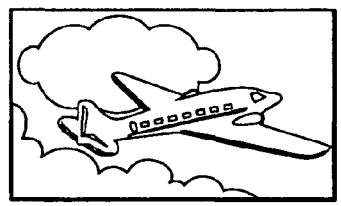
FIG. 8D

| Region Number | Input Line | Region in Screen |
|---|---|---|
| 0 | I1 | Upper Left |
| 1 | I5 | Upper Right |
| 2 | I8 | Lower Left and Lower Right |
| | | |
| | | |

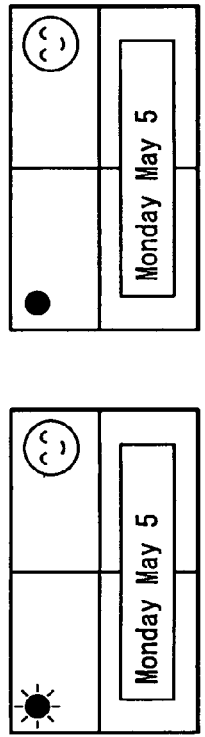
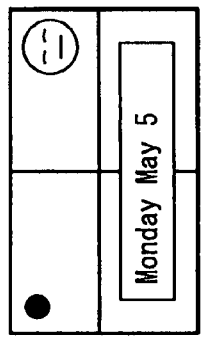
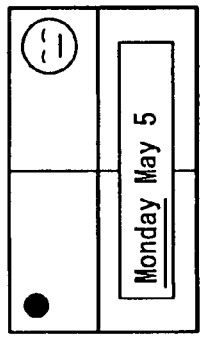
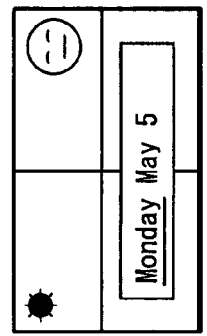
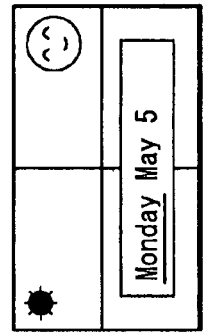
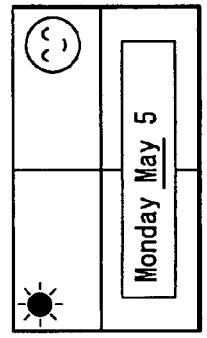
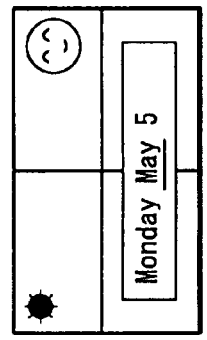
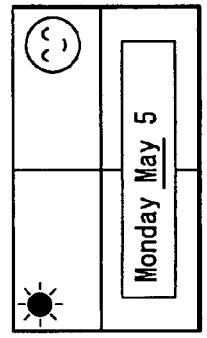
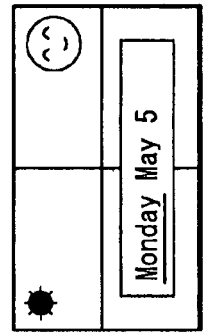
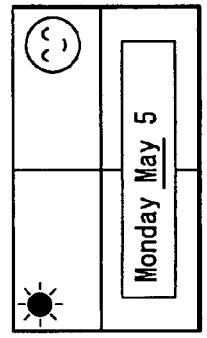
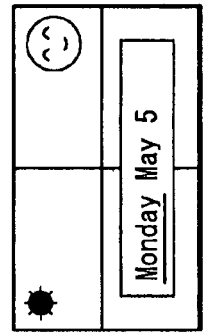
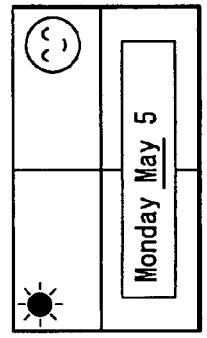

IMAGE SYNTHESIZING APPARATUS

CROSS REFERENCES TO RELATED APPLICATIONS

The present invention contains subject matter related to Japanese Patent Application JP 2006-275321 filed in the Japanese Patent Office on Oct. 6, 2006, the entire contents of which being incorporated herein by reference.

BACKGROUND OF THE INVENTION

1. Field of the Invention

The present invention relates to an image synthesizing apparatus that synthesizes images by keying.

2. Description of the Related Art

At a television channel or an image editing studio, an image synthesizing apparatus called an "effect switcher" is used to apply special effects in a process called "keying". Keying refers to a process that superimposes a key fill signal (an image signal to be superimposed onto a background image as the foreground) onto the background image (i.e., the main image signal that makes up a screen) in a region designated by a key source signal (i.e., an image signal in which a part where the signal level reaches a threshold or higher designates a region for superimposing an image).

FIG. 1 is a diagram showing a keying circuit in a typical effect switcher. The keying circuit includes four pairs of a key image selecting switch 51 and a key processing circuit 52 (such pairs are called "keyers"), an image synthesizing circuit 53, and a background image selecting switch 54.

In each keyer, the key image selecting switch 51 is a switch for selecting an image signal to be used for keying out of image signals inputted on input lines I1 to I9 from external video cameras, VTRs (Video Tape Recorders), and the like, and is constructed of a switch 51a for selecting a key fill signal and a switch 51b for selecting a key source signal.

The key fill signal and key source signal selected by the key image selecting switch 51 are sent to the key processing circuit 52. Based on various parameters, the key processing circuit 52 adjusts and processes the key fill signal and the key source signal to become suitable for keying. For example, values for adjusting the density of the key fill signal relative to the background image, values for adjusting the threshold of the key source signal, values for adjusting the position of the key source signal, values for adjusting a reduction ratio of the key fill signal, and adjustment values relating to a boundary line with the background image are used as the parameters.

The key fill signal and the key source signal that have been adjusted and processed by the key processing circuit 52 in each keyer are sent to the image synthesizing circuit 53. A background image that has been selected by the background image selecting switch 54 out of the image signals inputted on the input lines I1 to I9 is also sent to the image synthesizing circuit 53. The image synthesizing circuit 53 carries out a process on the key fill signals and the key source signals from the respective keyers to superimpose the key fill signals as foreground images on the background image using the key source signals as key values (alpha values for density when synthesizing images).

Only one pair of a key fill signal and a key source signal can be sent from each key processing circuit 52 to the image synthesizing circuit 53. Accordingly, only one foreground image can be superimposed on the background image at a time by a single keyer.

The present applicant has already proposed an invention that enables the operator to easily select a pair of a key fill signal and a key source signal from a plurality of candidates. However, according to such invention, only one pair of a key fill signal and a key source signal can be selected at a time. Accordingly, only one foreground image can be superimposed on the background image at a time by a single keyer (see Japanese Patent Application Publication No. 2002-185851).

With a television broadcast, there are many cases where a plurality of foreground images are simultaneously superimposed onto a background image. For example, the present time is displayed at an upper right position on the screen, a program logo is displayed at an upper left position on the screen, and explanatory subtitles are displayed at a lower position on the screen. In this case, with the effect switcher shown in FIG. 1, each keyer sends a pair of a key fill signal and a key source signal for superimposing one foreground image to the image synthesizing circuit 53. One keyer sends a key fill signal and a key source signal for superimposing the present time to the image synthesizing circuit 53. Another keyer sends a key fill signal and a key source signal for superimposing the program logo to the image synthesizing circuit 53. Yet another keyer sends a key fill signal and a key source signal for superimposing the explanatory subtitles to the image synthesizing circuit 53.

SUMMARY OF THE INVENTION

However, in the field of television broadcasts in recent years, for technical reasons relating to the increasing definition of image signals and for the commercial purpose of increasing the additional value of broadcast programs, there is now demand to simultaneously superimpose a larger number of foreground images than the three examples of time, program logo, and subtitles described earlier onto a background image.

Even though many foreground images occupy regions that form only part of the screen, it is necessary with the typical effect switcher shown in FIG. 1 to assign one keyer to each foreground image. Therefore, an even larger number of keyers than the four keyers shown in FIG. 1 become necessary when simultaneously superimposing a larger number of foreground images. The circuit scale of the image synthesizing circuit 53 also needs to be expanded so as to become capable of processing signals from a large number of keyers. In addition, the operator needs to carry out operations that select image signals using a large number of key image selecting switches 51. This means that the apparatus becomes costly and difficult to operate.

It is desirable to provide an image synthesizing apparatus where a plurality of foreground images can be simultaneously superimposed onto a background image using a single keyer.

An image synthesizing apparatus according to an embodiment of the present invention includes: a key image selector, a background selector, a key processor, an image synthesizer, a frame memory, a part designator, and a writing device. The key image selector is configured to select an image signal to be used for keying out of image signals inputted on a plurality of input lines. The background selector is configured to select a background image. The key processor is configured to process the image signal selected by the key image selector. The image synthesizer is configured to superimpose a foreground image onto the background image selected by the background selector using the image signal processed by the key processor. The part designator is configured to individually designate regions that are parts of a screen. The writing device is configured to carry out a write in a storage region corresponding to a region of the screen that has been designated by the part designator out of storage regions of the frame memory. In the image synthesizing apparatus, the image signal that has been selected by the key image selector is sent to the key processor, the image signal that has been processed by the key processor is sent to the writing device and written into the frame memory, and image signals read from every storage region of the frame memory are sent to the image synthesizer.

In the image synthesizing apparatus, out of the image signal for keying that has been selected and processed by the key image selector and the key processor, only the image signal in a region that is the part of the screen designated by the part designator is written by the writing device into the frame memory. Afterward, the image signal read from the entire frame memory is used by the image synthesizer to superimpose a foreground image onto a background image.

Here, a large number of foreground images occupy regions that are only parts of the screen. Therefore, by repeating the following process, the key fill signals and the key source signals for a plurality of foreground images are written one after the other into different storage regions in the frame memory. The process includes:

selecting an image signal for superimposing one foreground image using the key image selector;

designating a region to be occupied by the foreground image using the part designator;

carrying out a write into the frame memory;

selecting another image signal for superimposing a foreground image that occupies another region using the key image selector;

designating this other region using the part designator; and carrying out another write into the frame memory. Accordingly, by sending image signals read from every storage region of the frame memory to the image synthesizer, a plurality of foreground images can be simultaneously superimposed on the background image.

Accordingly, a plurality of foreground images can be simultaneously superimposed on a background image by a single keyer (a combination of a single key image selector and a key processor).

An image synthesizing apparatus according to another embodiment of the present invention includes: a key image selector, a background selector, a key processor, an image synthesizer, a first frame memory, a second frame memory, and a synthesizing writing device. The key image selector is configured to select a key fill signal and a key source signal. The background selector is configured to select a background image. The key processor is configured to process the key fill signal and the key source signal selected by the key image selector. The image synthesizer is configured to superimpose the key fill signal processed by the key processor as a foreground image onto the background image selected by the background selector using the key source signal processed by the key processor as key values. The first frame memory is used for key fill signals. The second frame memory is used for key source signals. In the image synthesizing apparatus, the following process is carried out. Accordingly, the key fill signal and the key source signal that have been selected by the key image selector are sent to the key processor. The key fill signal and the key source signal that have been processed by the key processor are sent to the synthesizing writing device. The synthesizing writing device writes, out of the key fill signal and the key source signal from the key processor, only signals for pixel positions where a value of the key source signal is nonzero respectively into storage regions, out of storage regions of the first frame memory and the second frame memory, that correspond to the pixel positions. Subsequently, signals that have been read from every storage region of the first frame memory and the second frame memory are sent to the image synthesizer.

In this image synthesizing apparatus, out of the key fill signal and key source signal that have been selected and processed by the key image selector and the key processor, only the signals for pixel positions where the value of the key source signal is nonzero are written into the respective frame memories for the key fill signals and the key source signals. Subsequently, the signals read from the entire frame memories are used by the image synthesizer to superimpose foreground images onto a background image. Note that the expression "value is zero" in the present specification refers to a value of a black level in an image signal where the key source signal is treated as having a density of 0%, and does not refer to an electric value where the signal level is zero.

Here, a large number of foreground images occupy regions that are only parts of the screen. Therefore, by repeating the following process, the key fill signals and the key source signals for a plurality of foreground images are written one after the other into different storage regions in the frame memories. The process includes:

selecting a key fill signal and a key source signal for superimposing one foreground image using the key image selector;

carrying out a write into the frame memories for only signals at some pixel positions out of such key fill signal and key source signal; and selecting another key fill signal and key source signal for superimposing a foreground image that occupies another region using the key image selector. Accordingly, by sending the key fill signals and key source signals read from every storage region of the frame memories to the image synthesizer, a plurality of foreground images can be simultaneously superimposed on the background image.

Accordingly, a plurality of foreground images can be simultaneously superimposed on a background image by a single keyer (a combination of a single key image selector and a key processor).

An image synthesizing apparatus according to yet another embodiment of the present invention includes: a key image selector, a background selector, a key processor, an image synthesizer, a first frame memory, a second frame memory, and a synthesizing writing device. The key image selector is configured to select a key fill signal and a key source signal. The background selector is configured to select a background image. The key processor is configured to process the key fill signal and the key source signal selected by the key image selector. The image synthesizer is configured to superimpose the key fill signal processed by the key processor as a foreground image onto the background image selected by the background selector using the key source signal processed by the key processor as key values. The first frame memory is used for key fill signals. The second frame memory is used for key source signals. In the image synthesizing apparatus, the following process is carried out. Accordingly, the key fill signal and the key source signal that have been selected by the key image selector are sent to the key processor. The key fill signal and the key source signal that have been processed by the key processor are sent to the synthesizing writing device. The synthesizing writing device writes, out of the key fill signal and the key source signal from the key processor, only signals for pixel positions corresponding to storage regions where nonzero values are stored in the second frame memory respectively into storage regions, out of the storage regions of the first frame memory and the second frame memory, that correspond to the pixel positions. Subsequently, signals that have been read from every storage region of the first frame memory and the second frame memory are sent to the image synthesizer.

In this image synthesizing apparatus, out of the key fill signal and key source signal that have been selected and processed by the key image selector and the key processor, only the signals for pixel positions corresponding to storage regions where the value zero is stored in the frame memory for the key source signal are written into the respective frame memories for key fill signals and key source signals. Subsequently, the signals read from the entire frame memories are used by the image synthesizer to superimpose foreground images onto a background image.

Here, a large number of foreground images occupy regions that are only parts of the screen. Therefore, by repeating the following process, the key fill signals and the key source signals for a plurality of foreground images are written one after the other into different storage regions in the frame memories. The process includes:

selecting a key fill signal and a key source signal for superimposing one foreground image using the key image selector;

carrying out a write of the key fill signal and the key source signal into the frame memories; and selecting a key fill signal and a key source signal for superimposing a foreground image that occupies another region using the key image selector. Accordingly, by sending the key fill signals and key source signals read from every storage region of the frame memories to the image synthesizer, a plurality of foreground images can be simultaneously superimposed on the background image.

Accordingly, a plurality of foreground images can be simultaneously superimposed on a background image by a single keyer (a combination of a single key image selector and a key processor).

According to embodiments of the present invention, an image synthesizing apparatus including a key image selector for selecting an image signal to be used for keying, a background selector for selecting a background image, a key processor for processing the image selected by the key image selector, and an image synthesizer for superimposing a foreground image onto the background image selected by the background selector using the image processed by the key processor. Accordingly, a plurality of foreground images can be simultaneously superimposed on a background image by a single keyer (i.e., a combination of a single key image selector and a key processor).

BRIEF DESCRIPTION OF THE DRAWINGS

FIGS. 4A to 4F are views showing an example method of operating the GUI screen shown in FIG. 3 and example display states.

FIGS. 8A to 8D are diagrams showing examples in which foreground images are superimposed on a background image by a single keyer.

FIGS. 18A to 18L are diagrams showing changes in the key fill signals and key source signals written into the frame memories in the modification shown in FIG. 15.

DESCRIPTION OF THE PREFERRED EMBODIMENTS

Preferred embodiments of the present invention will now be described with reference to the attached drawings.

Effect Switcher According to an Embodiment of the Present Invention

Figure 2:
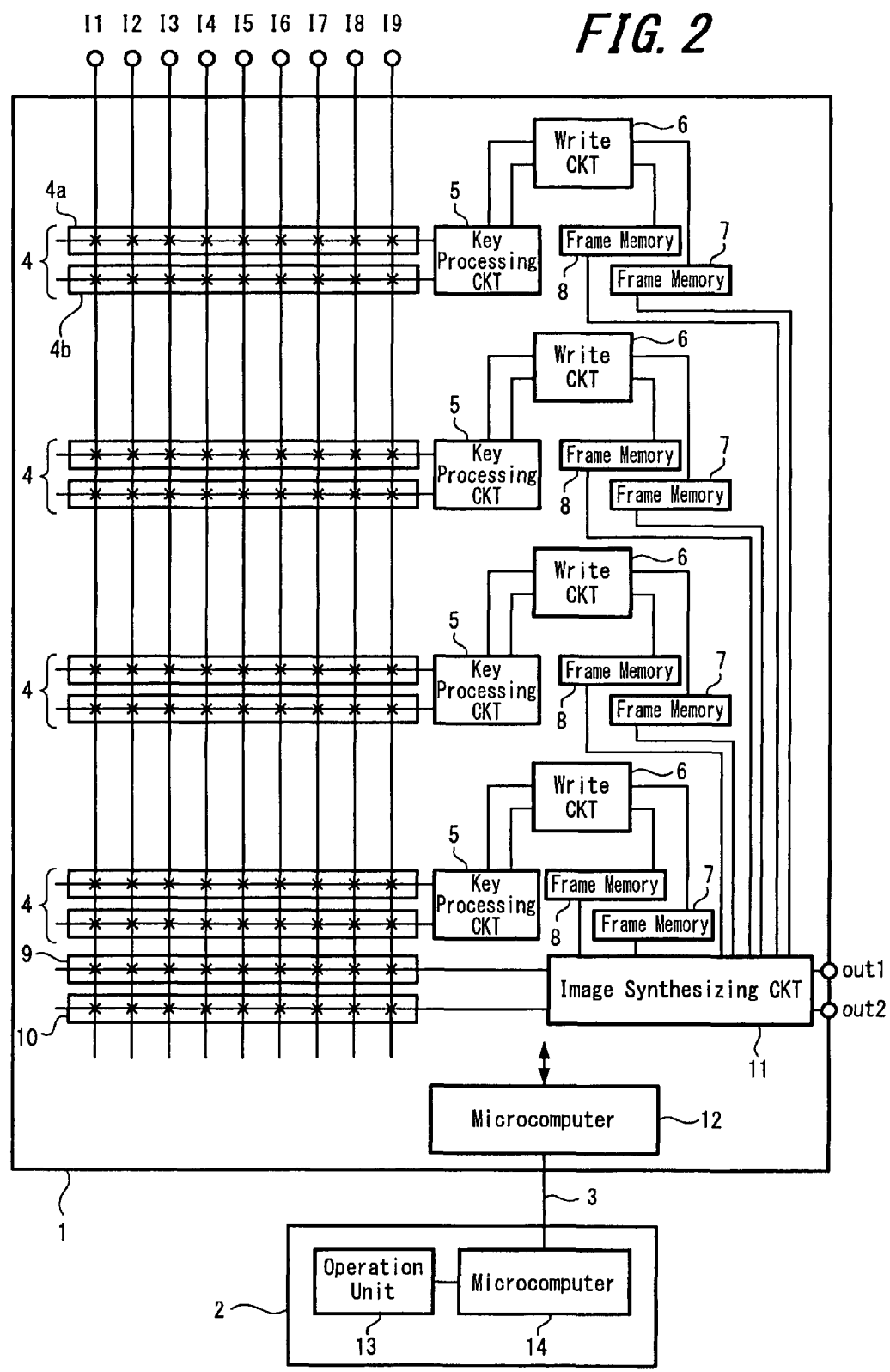
FIG. 2 is a diagram showing an example of the overall configuration of an effect switcher according to an embodiment of the present invention.

FIG. 2 is a block diagram showing an example of the overall configuration of an effect switcher according to an embodiment of the present invention. In this effect switcher, a main unit 1 and an operation panel 2 are connected by a communication channel 3 such as a LAN (Local Area Network).

The main unit 1 is provided with: four keyers each including a key image selecting switch 4 and a key processing circuit 5; background image selecting switches 9 and 10; an image synthesizing circuit 11; and a microcomputer 12 that controls various components inside the main unit 1. Note that control signal lines that connect the microcomputer 12 and the various components inside the main unit 1 are not shown in the drawing.

A write circuit 6 and frame memories 7 and 8 are separately provided for and associated with each keyer. As one example, the frame memories 7 and 8 are graphics memories that use DDR (Double Data Rate) SRAM.

In each keyer, the key image selecting switch 4 selects an image signal to be used for keying from image signals inputted on input lines I1 to I9 from external video cameras, VTRs, and the like. Each key image selecting switch 4 includes a switch 4a that selects a key fill signal and a switch 4b that selects a key source signal. The key fill signal is an image signal to be superimposed as the foreground onto a background image. The key source signal is an image signal in which a part where the signal level reaches a predetermined threshold or higher designates a region for superimposing an image, or an image signal that sets the density of the foreground.

The key fill signal and the key source signal that have been selected by the key image selecting switch 4 are sent to a key processing circuit 5. The key processing circuit 5 adjusts and processes the key fill signal and the key source signal to become suitable for keying based on various parameters. As examples of such parameters are used:

values for adjusting the density of the key fill signal relative to the background image;

values for adjusting the selection and designation of an image component of the key source signal to set as density (the key source signal to be outputted);

values for adjusting the threshold for the key source signal;

values for adjusting the position of the key source signal;

values for adjusting a reduction ratio of the key fill signal and the key source signal; and adjustment values relating to a boundary line with the background image; and the like.

The key fill signal and the key source signal that have been adjusted and processed by the key processing circuit 5 are sent to the write circuit 6. The write circuit 6 writes the key fill signal and the key source signal from the key processing circuit 5 into only storage regions that have been designated by the microcomputer 12 out of the storage regions in the frame memories 7 and 8.

Key fill signals and key source signals that have been read in each frame from all the storage regions of the frame memories 7 and 8 associated with each keyer are sent to the image synthesizing circuit 11.

The background image selecting switch 9 is a switch for selecting a program image, which is the background image to be displayed now, out of the image signals inputted on the input lines I1 to I9. Conversely, the background image selecting switch 10 is a switch for selecting a reset image, which is the background image to be displayed next, out of the image signals inputted on the input lines I1 to I9. The program image and reset image selected by the background image selecting switches 9 and 10 are sent to the image synthesizing circuit 11.

The image synthesizing circuit 11 carries out a process on the key fill signals and the key source signals from the frame memories 7 and 8 associated with the respective keyers to superimpose the key fill signals onto the program image as foreground images using the key source signals as key values (alpha values for density when synthesizing images).

The program image on which the foreground images have been superimposed by the image synthesizing circuit 11 is outputted to the periphery from a program output line out1. The reset image sent from the image synthesizing circuit 11 is also outputted unchanged to the periphery from a preview output line out2.

The operation panel 2 has an operation unit 13 that is to be operated by the operator provided on a panel surface and is also provided with a microcomputer 14.

Key selecting buttons for each keyer (buttons for selecting a key fill signal and a key source signal using the key image selecting switch 4), background selecting buttons for the background image selecting switches 9 and 10, and a display, pointing device, buttons, and the like for a GUI (Graphic User Interface) are disposed on the operation unit 13.

Aside from being used to input various parameters (for example, parameters for adjusting and processing the key fill signal and the key source signal using the key processing circuit 5 of each keyer), the GUI of the operation unit 13 is used to designate regions that are parts of the screen for each keyer in order to have foreground images superimposed in such regions.

Figure 3:
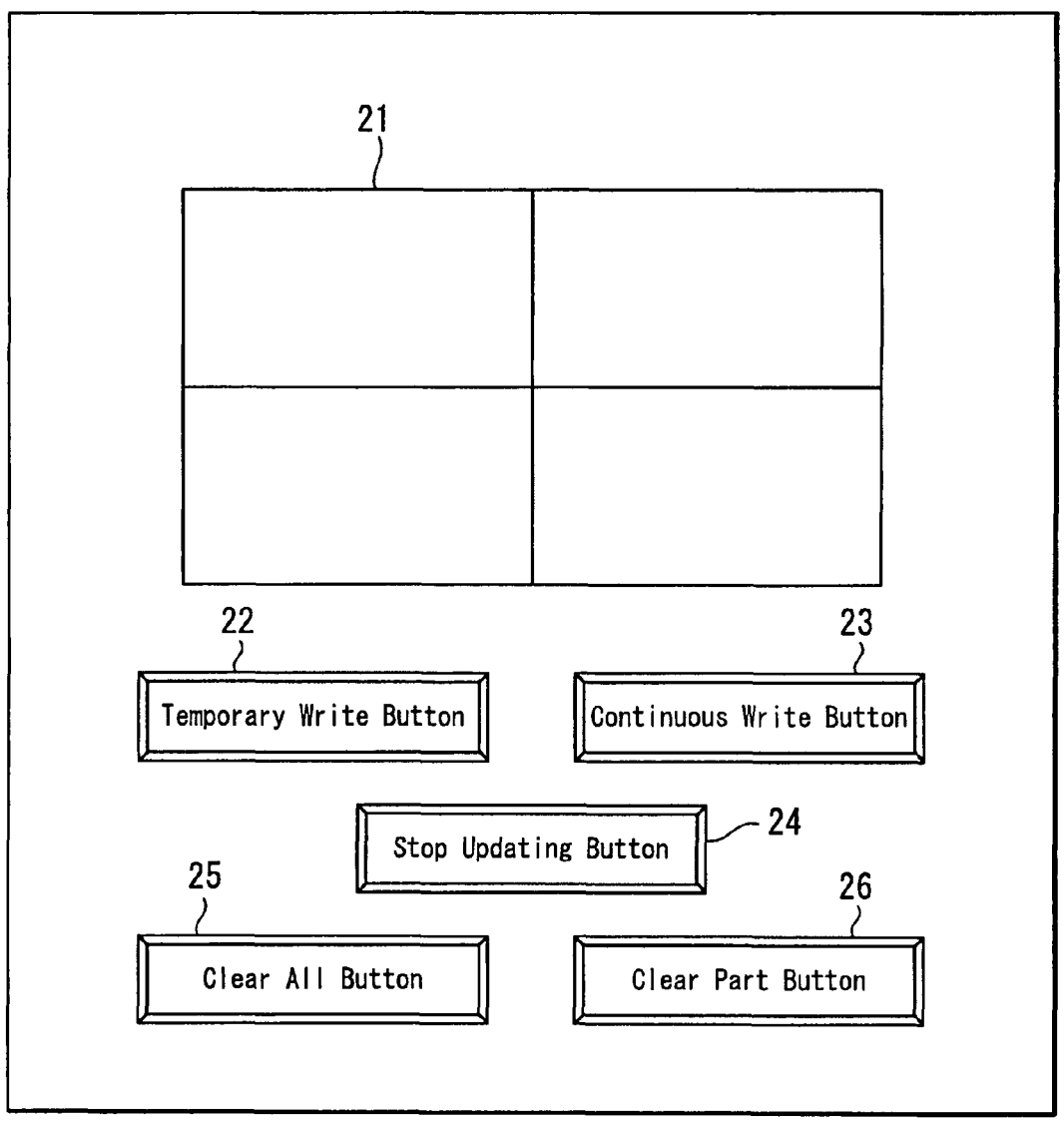
FIG. 3 is a view showing a GUI screen for superimposing foreground images.

FIG. 3 is a view showing a GUI screen for superimposing foreground images. In this GUI screen, a graphic 21 of a divided screen that has been divided vertically and horizontally in advance into four equal parts, a temporary write button 22, a continuous write button 23, a stop updating button 24, a clear all button 25, and a clear part button 26 are displayed.

FIGS. 4A to 6D are views showing a method of operating this GUI screen and display states of the GUI screen. For example, when the operator wishes to designate the upper left region of the screen, as shown in FIG. 4A, the operator uses the pointing device to move the cursor C to and click the upper left region in the graphic 21. In response, as shown in FIG. 4B, the upper left region is displayed using a different color to regions that have not been designated (in the drawings, this different color is shown by oblique shading).

If the operator wishes to superimpose a still image as a foreground image onto this upper left region, as shown in FIG. 4C, the operator moves the cursor C to and clicks the temporary write button 22. In response, as shown in FIG. 4D, by further changing the color of the upper left region (in FIG. 4D, this changed state is shown by a dot pattern), the display shows that a write has been carried out for this region in the frame memories 7 and 8 (see FIG. 2).

Subsequently, if the operator wishes to designate the upper right region of the screen, for example, as shown in FIG. 4E, the operator moves the cursor C to and clicks the upper right region in the graphic 21. In response, as shown in FIG. 4F, the upper right region is also displayed using a different color to regions that have not been designated.

Figure 5A:
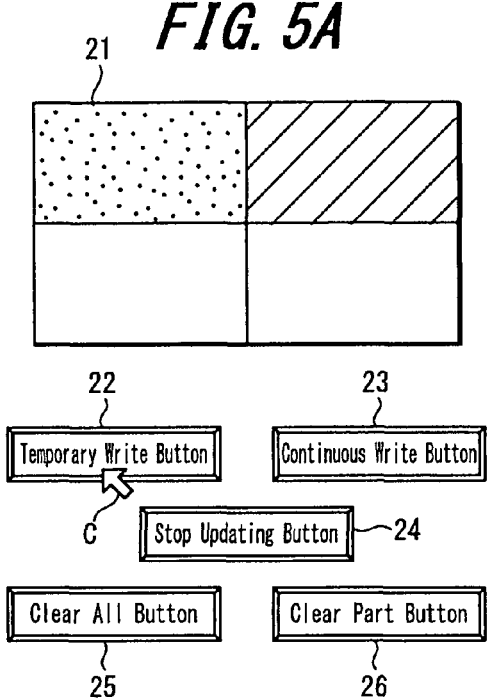
FIGS. 5A to 5F are views showing an example method of operating the GUI screen shown in FIG. 3 and example display states.
Figure 5B:
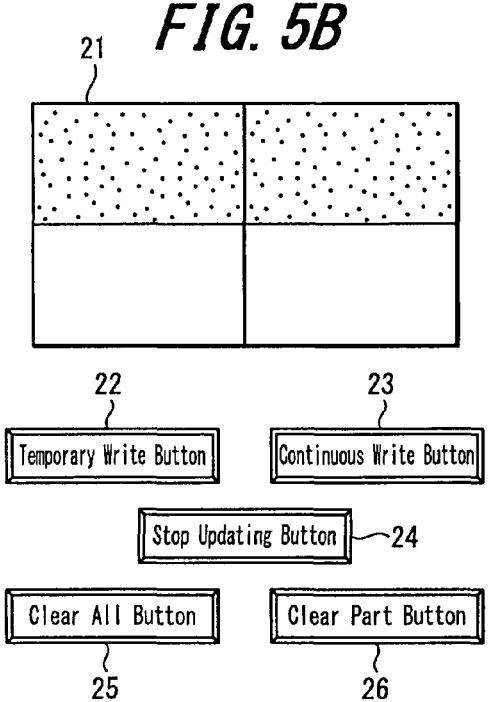

Next, if the operator wishes to superimpose a still image as a foreground image onto the upper right region, as shown in FIG. 5A, the operator moves the cursor C to and clicks the temporary write button 22. In response, as shown in FIG. 5B, the color of the upper right region is also changed to show that a write has been carried out for this region in the frame memories 7 and 8.

Figure 5C:
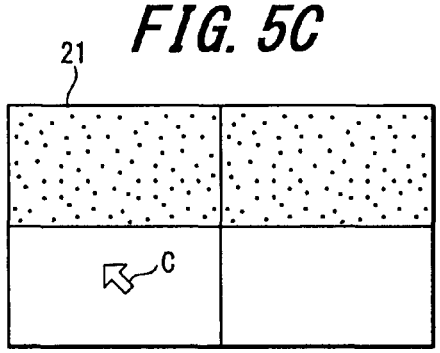
Figure 5D:
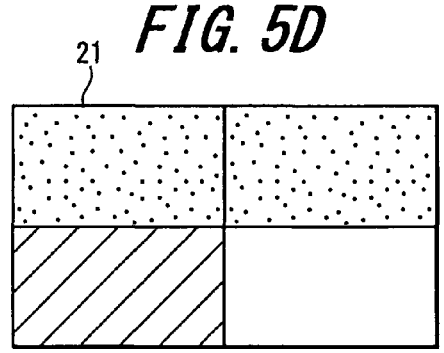
Figure 5E:
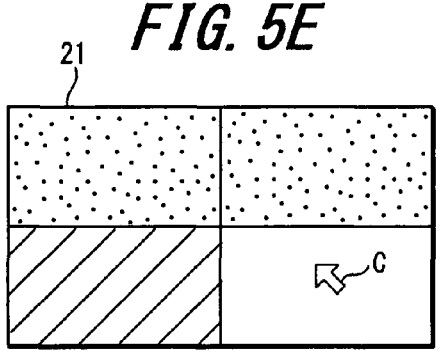
Figure 5F:
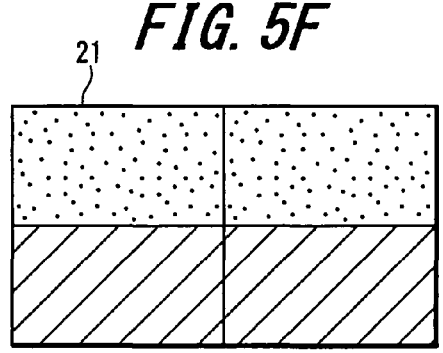

Subsequently, if the operator wishes to designate the lower region of the screen, for example, as shown in FIG. 5C, the operator moves the cursor C to and clicks the lower left region in the graphic 21. In response, as shown in FIG. 5D, the lower left region is also displayed using a different color to regions that have not been designated. Next, as shown in FIG. 5E, the operator moves the cursor C to and clicks the lower right region in the graphic 21. In response, as shown in FIG. 5F, the lower right region is also displayed using a different color to regions that have not been designated.

Figure 6A:
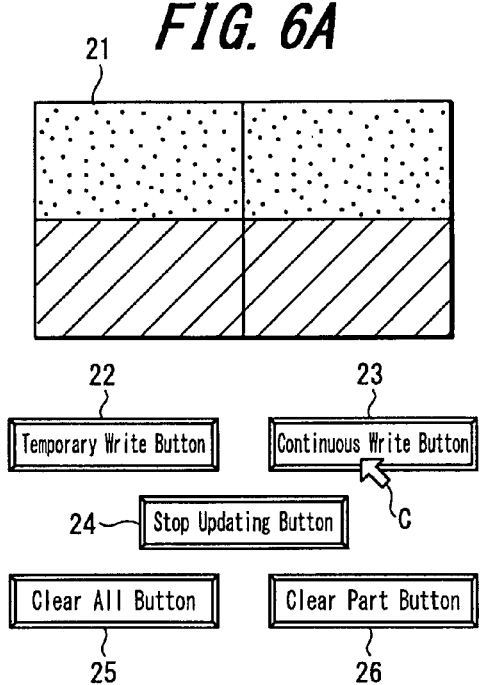
FIGS. 6A to 6D are views showing an example method of operating the GUI screen shown in FIG. 3 and example display states.
Figure 6B:
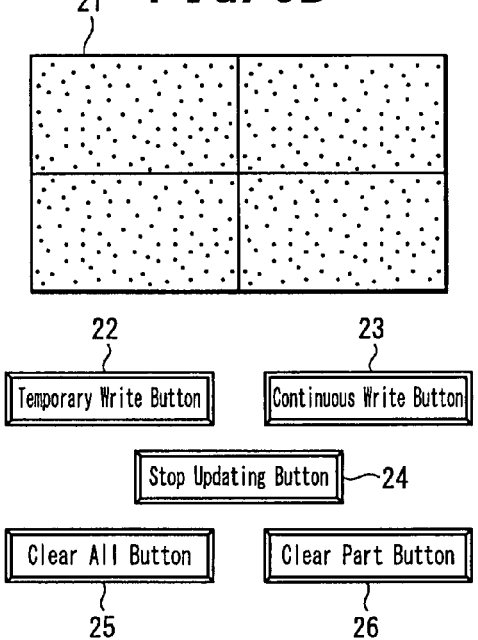

Also, if the operator wishes to superimpose video as a foreground image onto this lower region, as shown in FIG. 6A, the operator moves the cursor C to and clicks the continuous write button 23. In response, as shown in FIG. 6B, the color of the lower region is changed to show writes are being continuously carried out in the frame memories 7 and 8 for this region in each frame.

Figure 6C:
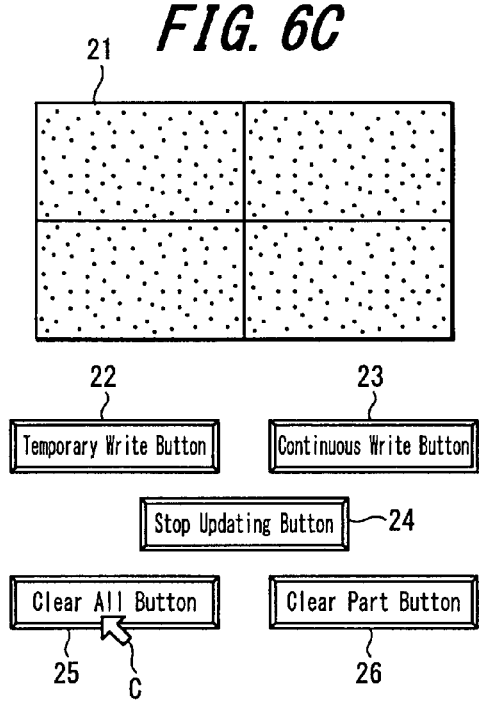
Figure 6D:
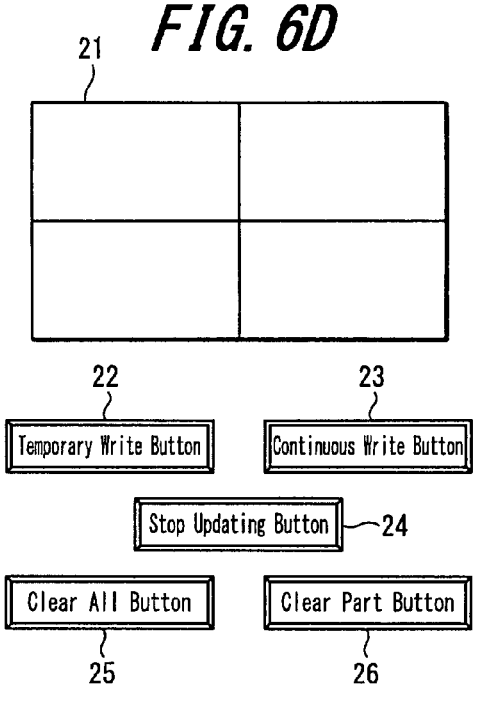

Subsequently, if the operator wishes to end the superimposing of all the foreground images, as shown in FIG. 6C, the operator moves the cursor C to and clicks the clear all button 25. In response, as shown in FIG. 6D, the color of every region in the graphic 21 is restored to the same color as when the regions are not designated.

Although not illustrated, when the operator wishes to freeze the movement of video images being superimposed as foreground images (i.e., to use video as a still image), the operator moves the cursor to and clicks the region(s) in the graphic 21 where the video is being superimposed and then moves the cursor to and clicks the stop updating button 24.

Also, if the operator wishes to end the superimposing of a foreground image in a region that is only one part of the screen, the operator moves the cursor to and clicks such region in the graphic 21 and then moves the cursor to and clicks the clear part button 26. In response, the color of only this region is restored to the same color as when the region is not designated.

Figure 7:
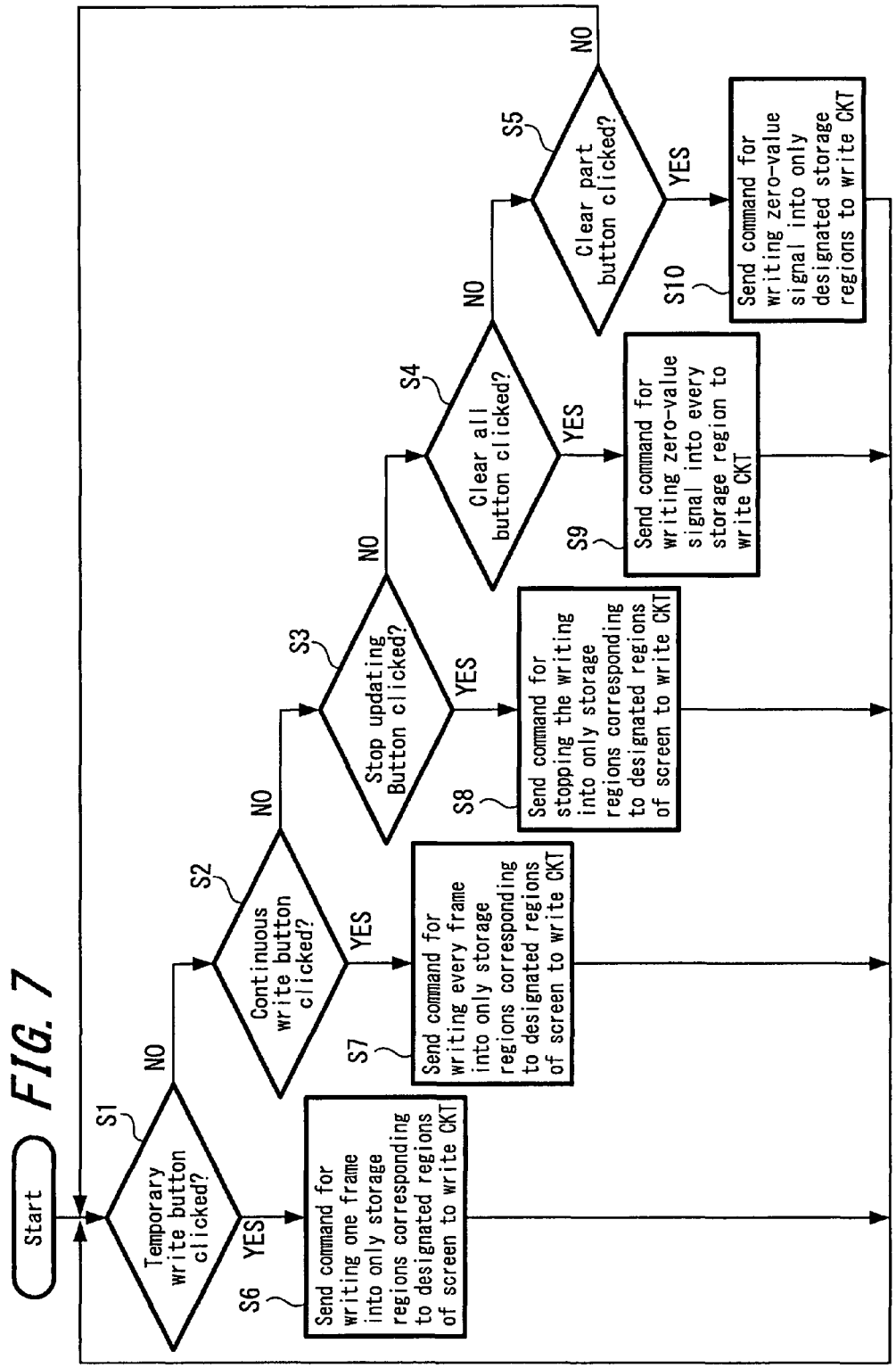
FIG. 7 is a flowchart showing a process executed by a microcomputer of a main unit based on an operation of the GUI screen shown in FIG. 3.

The microcomputer 14 (see FIG. 2) of the operation panel 2 sends a signal that indicates the operation content for the GUI screen shown in FIG. 3 via the communication channel 3 to the microcomputer 12 of the main unit 1. FIG. 7 is a flowchart showing a process carried out by the microcomputer 12 of the main unit 1 based on the signal indicating the operation content for the GUI screen for a given keyer.

In the process, a determination of whether the temporary write button 22 has been clicked (step S1), a determination of whether the continuous write button 23 has been clicked (step S2), a determination of whether the stop updating button 24 has been clicked (step S3), a determination of whether the clear all button 25 has been clicked (step S4), and a determination of whether the clear part button 26 has been clicked (step S5) are repeated until one of the determinations is yes.

When the determination in step S1 is yes, one frame is written into only storage regions that correspond to the region(s) of the screen that was/were designated when the temporary write button 22 was clicked (the upper left region in the example shown in FIG. 4C described earlier or the upper right region in the example shown in FIG. 4F described earlier) out of the storage regions in the frame memories 7 and 8 associated with the relevant keyer. Subsequently, a command to maintain the stored content of such storage regions is sent to the write circuit 6 associated with the relevant keyer (step S6). After this, the processing returns to step S1.

When the determination in step S2 is yes, a command is sent to the write circuit 6 associated with the relevant keyer (step S7). The command is sent for carrying out a write for every frame into only storage region(s) corresponding to the region(s) in the screen that was/were designated when the continuous write button 23 was clicked out of the storage regions of the frame memories 7 and 8 associated with the relevant keyer. After this, the processing returns to step S1.

When the determination in step S3 is yes, a command is sent to the write circuit 6 associated with the relevant keyer (step S8). The command is sent for stopping writes into storage regions corresponding to the region(s) in the screen that was/were designated when the stop updating button 24 was clicked out of the storage regions of the frame memories 7 and 8 associated with the relevant keyer and thereafter maintaining the stored content of such storage region(s). After this, the processing returns to step S1.

When the determination in step S4 is yes, a command is sent to the write circuit 6 associated with the relevant keyer (step S9). The command is sent for writing a signal with the value zero into all of the storage regions of the frame memories 7 and 8 associated with the relevant keyer (i.e., a command for writing a signal with the value zero and then stopping writes into all of the storage regions in the same way as in step S8). After this, the processing returns to step S1.

When the determination in step S5 is yes, a command is sent to the write circuit 6 associated with the relevant keyer (step S10). The command is sent for writing a signal with the value zero into only the storage region corresponding to region(s) in the screen that was/were designated when the clear part button 26 was clicked out of the storage regions of the frame memories 7 and 8 associated with the relevant keyer (i.e., a command for writing a signal with the value zero and then stopping writes into the relevant storage regions in the same way as in step S8). After this, the processing returns to step S1.

Next, an example of the superimposing of foreground images on a background image by one keyer in the effect switcher will be described. As shown in FIG. 8A, out of the input lines I1 to I9, an image signal for displaying a picture of the sun in only the upper left region of the screen is inputted on the input line I2. Further, an input signal for displaying the characters "Special" in only the upper right region of the screen is inputted on the input line I4. Furthermore, an image signal for displaying characters showing the date, such as "Monday May 5", surrounded by a rectangular frame in only the lower region of the screen is inputted on the input line I7.

Here, assume that in a state where the image signal on the input line I2 has been selected using the key selecting button of a certain keyer disposed on the operation unit 13 (see FIG. 2), the operator has designated the upper left region of the graphic 21 and clicked the temporary write button 22 as shown in FIGS. 4A to 4D described earlier.

In response, based on steps S1 and S6 of the process shown in FIG. 7, the key fill signal and key source signal that have been inputted on the input line I2 and processed by the key processing circuit 5 are written for one frame into only the respective storage regions corresponding to the upper left region of the screen in the frame memories 7 and 8 associated with the relevant keyer.

Subsequently, assume that the operator has selected the image signal on the input line I4 using a key selecting button, designated the upper right region in the graphic 21 as shown in FIGS. 4E to 5B described earlier in the GUI screen, and then clicked the temporary write button 22.

In response, based on steps S1 and S6 of the process shown in FIG. 7, the key fill signal and key source signal that have been inputted on the input line I4 and processed by the key processing circuit 5 are written for one frame into only the respective storage regions corresponding to the upper right region of the screen out of the frame memories 7 and 8.

Subsequently, assume that the operator has selected the image signal on the input line I7 using a key selecting button, designated the lower region in the graphic 21 as shown in FIGS. 5C to 6B described earlier in the GUI screen, and then clicked the continuous write button 23.

In response, based on steps S2 and S7 of the process shown in FIG. 7, the key fill signal and the key source signal that have been inputted on the input line I7 and processed by the key processing circuit 5 are written in each frame into the storage regions corresponding to the lower region of the screen out of the frame memories 7 and 8.

Accordingly, as shown in FIG. 8B, key fill signals and key source signals for superimposing three foreground images that are a picture of the sun, the characters "Special", and characters showing the date surrounded by a frame respectively onto the upper left region, the upper right region, and the lower region of the screen are written into the frame memories 7 and 8.

Accordingly, a background image (program image) such as that shown in FIG. 8C has been selected using the background selecting button used as the background image selecting switch 9 on the operation unit 13 of the operation panel 2. Then, as shown in FIG. 8D, the image synthesizing circuit 11 uses the key fill signals and the key source signals from the frame memories 7 and 8 to superimpose the picture of the sun, the characters "Special", and the characters showing the date surrounded by a frame respectively onto the upper left region, the upper right region, and the lower region of this background image.

If the image signal of the characters showing the date inputted on the input line I7 is a video image signal, only the characters showing the date that are superimposed onto the lower region will change over time, with the picture of the sun superimposed on the upper left region and the characters "Special" superimposed on the upper right region remaining unchanged. As a result, a mixture of still foreground images and a video foreground image is superimposed.

Note that in the example shown in FIGS. 8A to 8D foreground images that fundamentally occupy regions that are only parts of the screen are superimposed. However, by designating a region that is part of the screen using the graphic 21 on the GUI screen, a foreground image that would normally occupy the entire screen (as one example, an image signal where a large number of pictures of the sun such as that on the input line I2 shown in FIG. 8A are displayed across the entire screen) can be superimposed in a region that is limited to only part of the screen.

Figure 1:
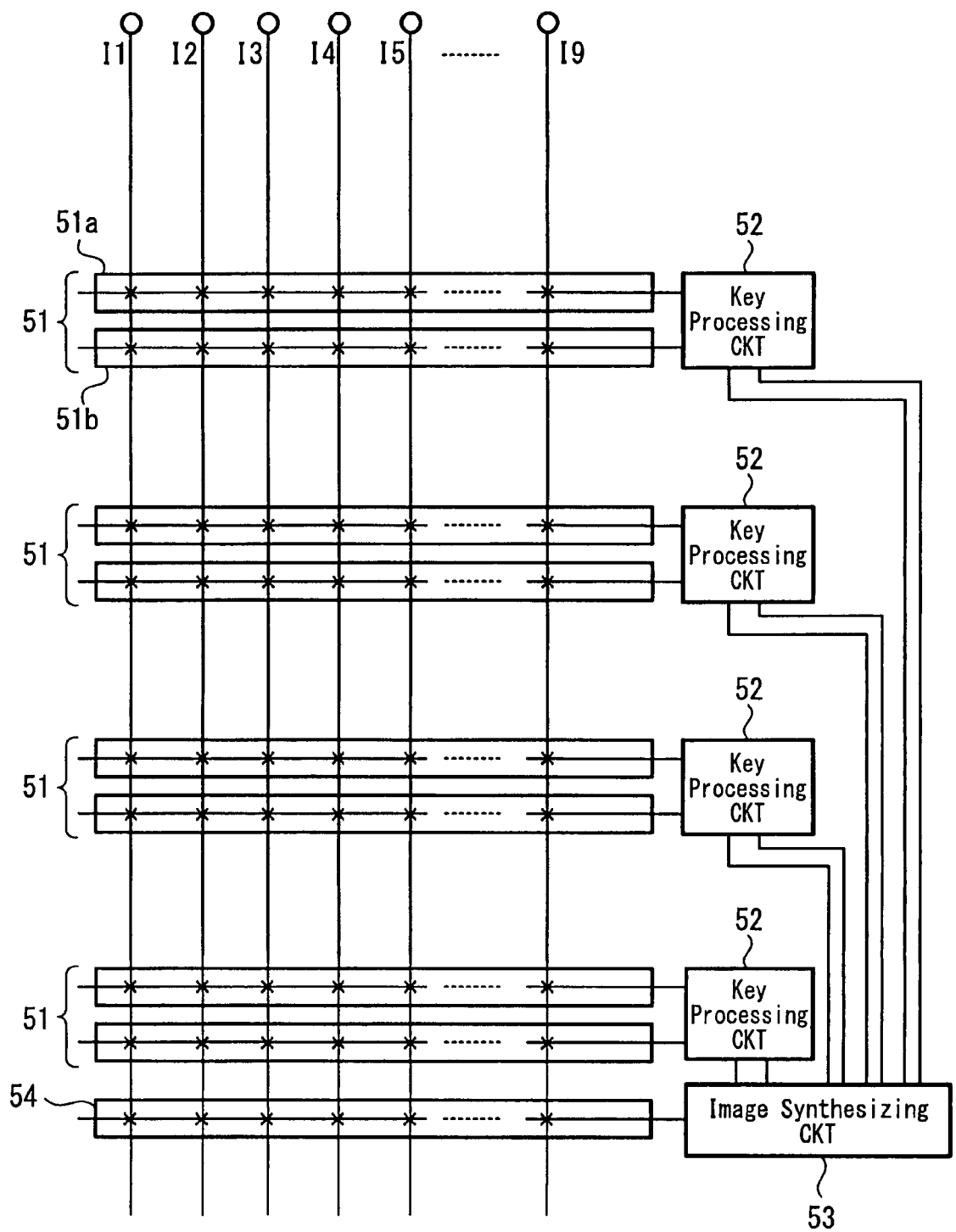
FIG. 1 is a diagram showing a circuit for keying in an effect switcher according to related art.

As described above, with the effect switcher according to an embodiment of the present invention, it is possible to simultaneously superimpose a plurality of foreground images onto the background image using a single keyer. Accordingly, although the number of keyers is suppressed to four in the same way as with the typical effect switcher shown in FIG. 1, it is possible to simultaneously superimpose a larger number of foreground images on the background image using little hardware, which makes the effect switcher according to an embodiment of the present invention economical. In addition to being used for writing key fill signals and key source signals for a plurality of foreground images as described in the embodiment of the present invention, the frame memories can be used for operations such as enlarging or reducing images. Using the frame memories 7 and 8 for multiple purposes in this way is more economical than providing separate frame memories.

Also with the effect switcher according to an embodiment of the present invention, an operation that separately designates regions that are parts of the screen can be carried out by designating regions in the screen graphic 21 that is divided in advance on the GUI screen. This makes such operations easy to carry out.

Also, with the effect switcher, by appropriately using the temporary write button 22 and the continuous write button 23 on the GUI screen, it is possible to superimpose a mixture of still foreground images and video foreground images onto the background image using a single keyer, which increases the additional value of the images.

Next, a number of modifications to the configuration of the effect switcher will be described.

Modification 1

Figure 9A:
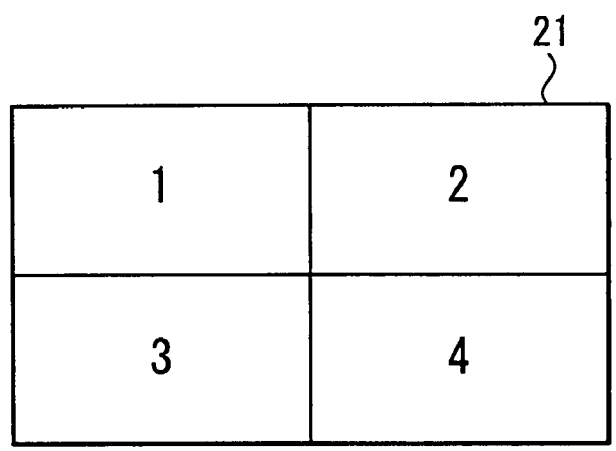
FIGS. 9A and 9B are views showing a modification to a graphic of a divided screen in the GUI screen shown in FIG. 3.
Figure 9B:
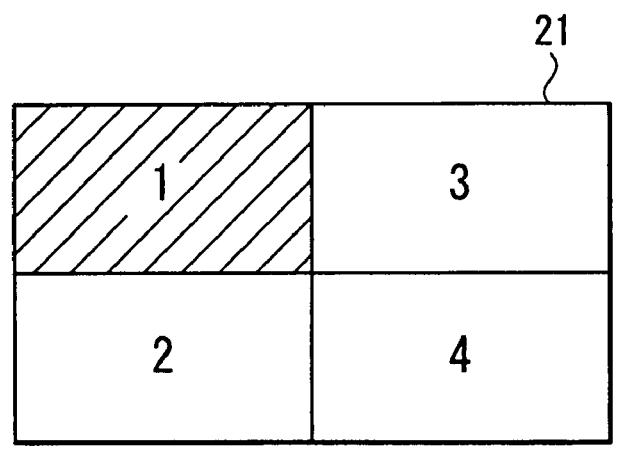

FIGS. 9A and 9B are diagrams showing a modification to the divided screen graphic 21 on the GUI screen shown in FIG. 3. In this modification, as shown in FIG. 9A, the numbers 1 to 4 are displayed in the four regions of the divided screen graphic 21. The operator designates regions by inputting numbers using a ten key pad (not shown) or by pressing buttons (also not shown) corresponding to the respective numbers. For example, when the region numbered "1" is designated, as shown in FIG. 9B, the region numbered "1", is displayed using a different color to regions that have not been designated (in the drawings, such different color is shown by oblique shading).

Modification 2

Figure 10:
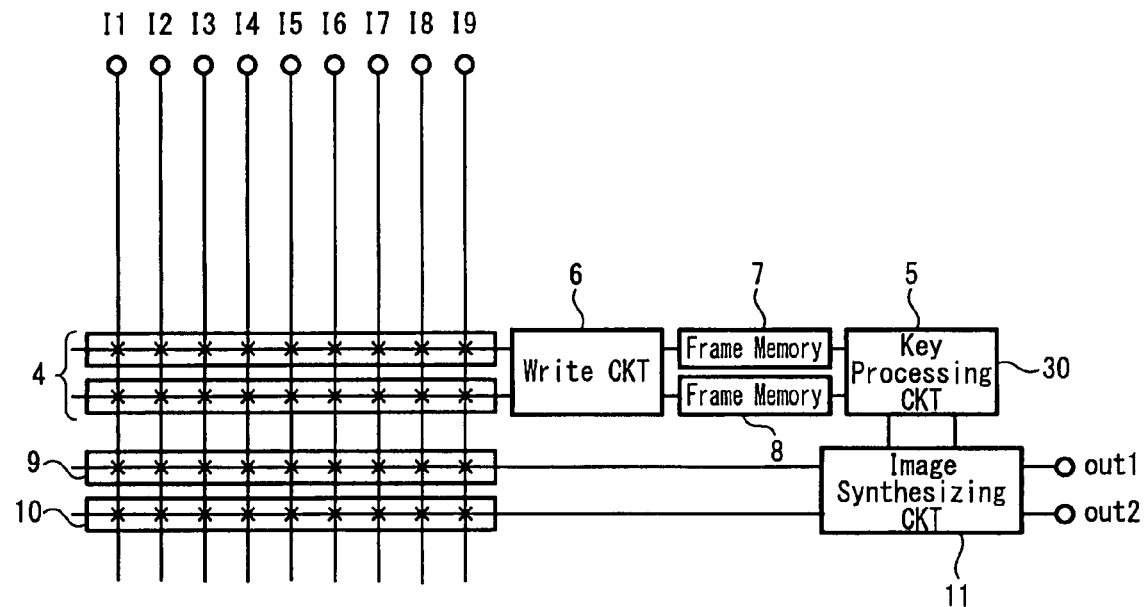
FIG. 10 is a diagram showing a modification to the configuration of a main unit shown in FIG. 2.

FIG. 10 is a diagram showing a modification to the configuration of the main unit 1 shown in FIG. 2. Circuits that are the same as in FIG. 2 have been assigned the same reference numerals (although only one keyer is illustrated out of convenience for the modifications described below, the same configuration may be used for all four keyers). Although the write circuit 6 and the frame memories 7 and 8 are provided downstream of the key processing circuit 5 in the configuration shown in FIG. 2, in this modification, the write circuit 6 and the frame memories 7 and 8 are provided upstream of the key processing circuit 5.

The key fill signal and the key source signal selected by the key image selecting switch 4 are sent to the write circuit 6. As described earlier, the write circuit 6 writes the key fill signal and the key source signal from the key image selecting switch 4 into only respective storage regions designated by the microcomputer 12 (see FIG. 2) out of the storage regions of the frame memories 7 and 8.

A key fill signal and a key source signal read from all of the storage regions in each frame are sent from the frame memories 7 and 8 to the key processing circuit 5. The key processing circuit 5 adjusts and processes the key fill signal and the key source signal based on various parameters and then sends the key fill signal and the key source signal to the image synthesizing circuit 11.

With this modification also, it is possible to simultaneously superimpose a plurality of foreground images onto the background image using a single keyer. However, with the configuration shown in FIG. 2, since a key fill signal and a key source signal are adjusted and processed by the key processing circuit 5 before writing in the frame memories 7 and 8, it is possible to adjust and process the key fill signals and the key source signals using different parameters in each region of the screen. On the other hand, with this modification, the key fill signal and the key source signal read from every storage region of the frame memories 7 and 8 are collectively adjusted and processed by the key processing circuit 5. This means that it may be not possible to adjust and process the signals using different parameters in each region of the screen and the entire screen is adjusted and processed using the same parameters. Accordingly, the configuration shown in FIG. 2 is favorable in increasing the freedom with which signals can be adjusted and processed.

Modification 3

Figure 11:
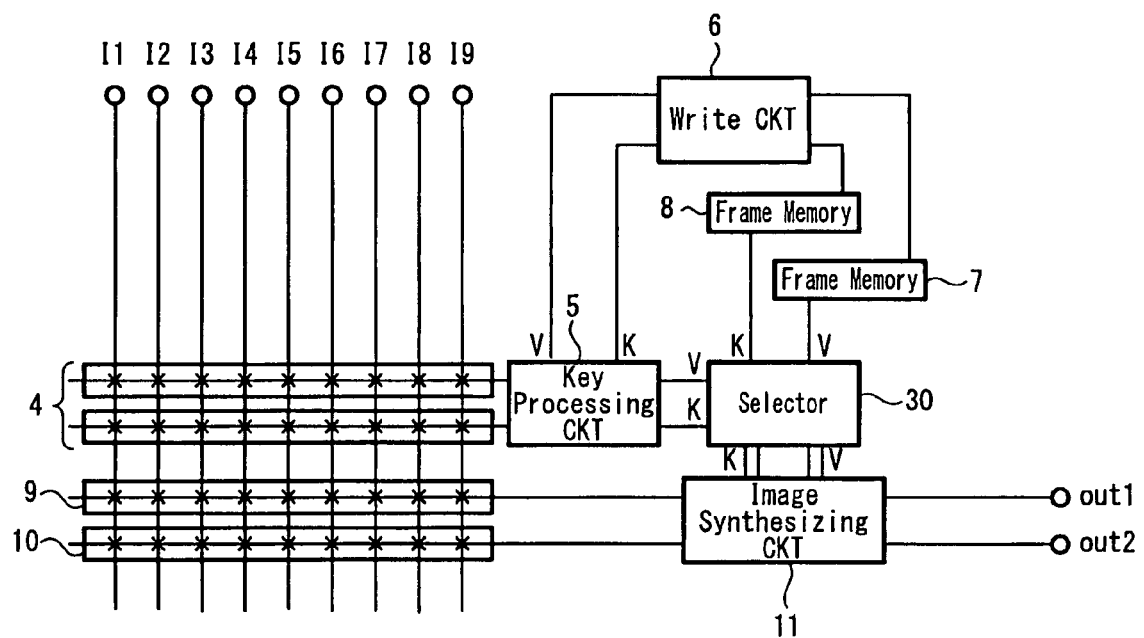
FIG. 11 is a diagram showing a modification to the configuration of the main unit shown in FIG. 2.

FIG. 11 is a diagram showing a modification to the configuration of the main unit 1. Circuits that are the same as in FIG. 2 have been assigned the same reference numerals. The key fill signals and the key source signals have been respectively assigned the symbols "V" and "K". In this modification, a selector 31 is provided in the input circuit to the image synthesizing circuit 11, with this selector 31 selecting whether the key fill signal V and the key source signal K read from the frame memories 7 and 8 are sent to the image synthesizing circuit 11 or whether the key fill signal V and the key source signal K from the key processing circuit 5 are sent directly to the image synthesizing circuit 11.

Although not illustrated, a button for making a selection operation is provided on the operation unit 13 (see FIG. 2) of the operation panel 2. The microcomputer 12 (shown in FIG. 2) of the main unit 1 controls the selector 31 in accordance with a signal which indicates the operation content of this button and is sent from the microcomputer 14 of the operation panel 2.

For example, in a state where the key fill signal V and the key source signal K from the frame memories 7 and 8 are selected and a plurality of foreground images are being simultaneously superimposed, by temporarily switching the selection to the key fill signal V and the key source signal K from the key processing circuit 5, it is possible to temporarily suspend the superimposing of the plurality of foreground images and instead have a different new foreground image superimposed.

Figure 12A:
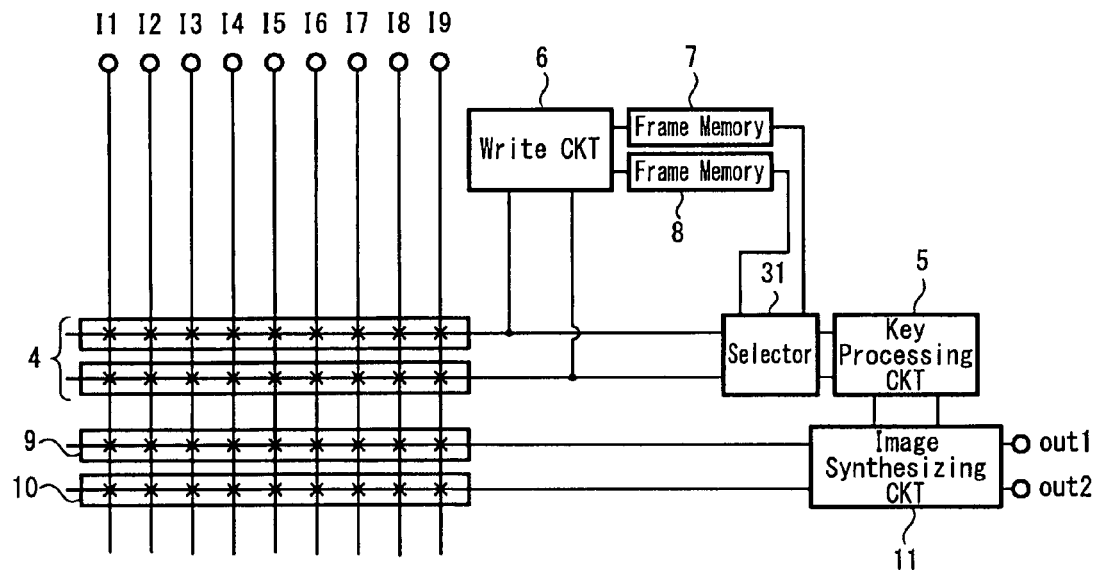
FIGS. 12A and 12B are diagrams showing modifications to the configuration of a main unit shown in FIG. 2.

FIG. 12A shows an example where the selector 31 is provided in the same way as in FIG. 11 in the modification shown in FIG. 10 (i.e., the modification where the frame memories 7 and 8 are provided upstream of the key processing circuit 5).

Figure 12B:
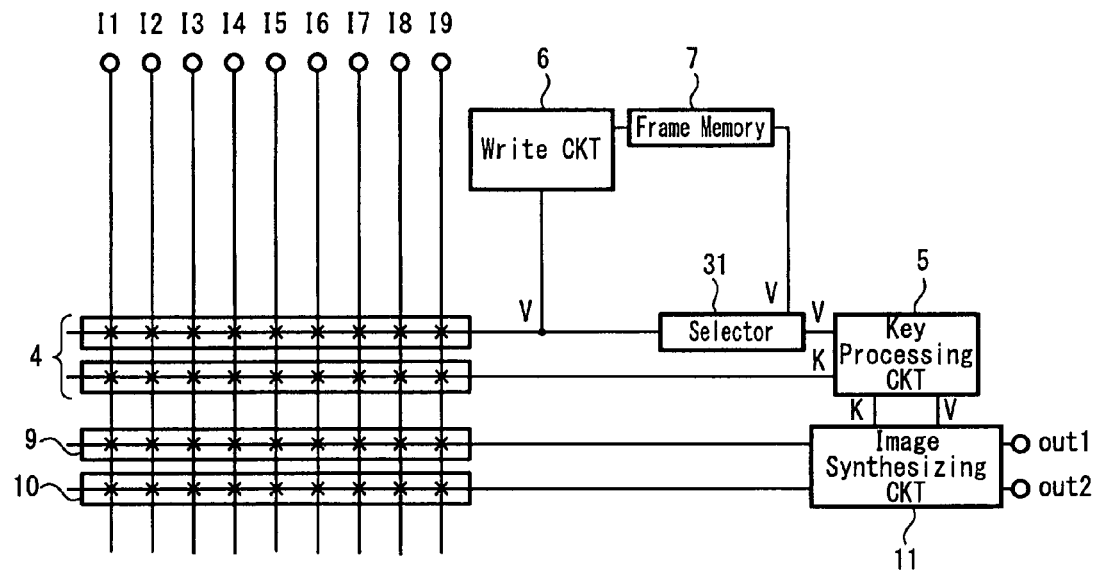

FIG. 12B shows a modification where the frame memory 8 (i.e., the frame memory for the key source signal K) is omitted from the example shown in FIG. 12A and the key fill signal K from the switch 4b out of the key image selecting switch 4 is sent directly to the key processing circuit 5. This modification is effective when the key processing circuit 5 generates the key source signal based on only the key fill signal. As one example, when an image of subtitles is superimposed onto a background image with the shapes of characters themselves as the key source signal, once just the key fill signal (an image signal of the characters of the subtitles) has been stored in the frame memory, it will be possible to generate a key source signal based on the key fill signal, and accordingly the configuration shown in FIG. 12B will suffice.

Modification 4

Figure 13:
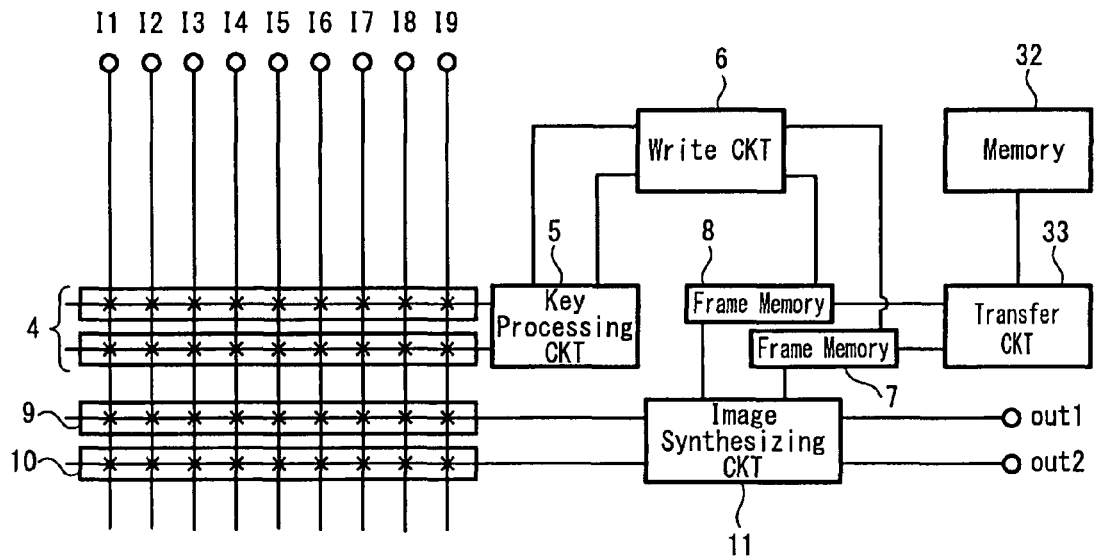
FIG. 13 is a diagram showing a modification to the configuration of the main unit shown in FIG. 2.

FIG. 13 is a diagram showing a modification to the configuration of the main unit 1. Circuits that are the same as in FIG. 2 have been assigned the same reference numerals. This modification is provided with a transfer circuit 33 that transfers and stores the key fill signals and the key source signals written in every storage region of the frame memories 7 and 8 to a separate memory 32 and loads the key fill signals and the key source signals stored in the memory 32 into the frame memories 7 and 8. The memory 32 is a volatile or nonvolatile memory and has a sufficient capacity to store a plurality of pairs of key fill signal and key source signal for one frame.

Although not illustrated, the following buttons (1) and (2) are provided on the operation unit 13 (see FIG. 2) of the operation panel 2.

(1) A transfer button for designating transfer to the memory 32.

(2) A load button for selecting a desired pair or pairs of key fill signal and key source signal out of one or plurality of pairs of key fill signal and key source signal in the memory 32 and designating a load into the frame memories 7 and 8.

When a signal indicating that the transfer button has been operated is sent from the microcomputer 14 of the operation panel 2, the microcomputer 12 (see FIG. 2) of the main unit 1 controls the transfer circuit 33 to transfer the key fill signals and key source signals written in every storage region of the frame memories 7 and 8 to the memory 32 to store the signals. Also, when a signal indicating that the load button has been operated is sent from the microcomputer 14 of the operation panel 2, the microcomputer 12 of the main unit 1 controls the transfer circuit 33 to load the selected pair or pairs of key fill signal and key source signal out of the key fill signals and key source signals in the memory 32 into the frame memories 7 and 8.

According to this modification, it is possible to recreate the simultaneous superimposing of a plurality of still foreground images that were simultaneously superimposed in the past by carrying out a simple operation.

Modification 5

Figure 14:
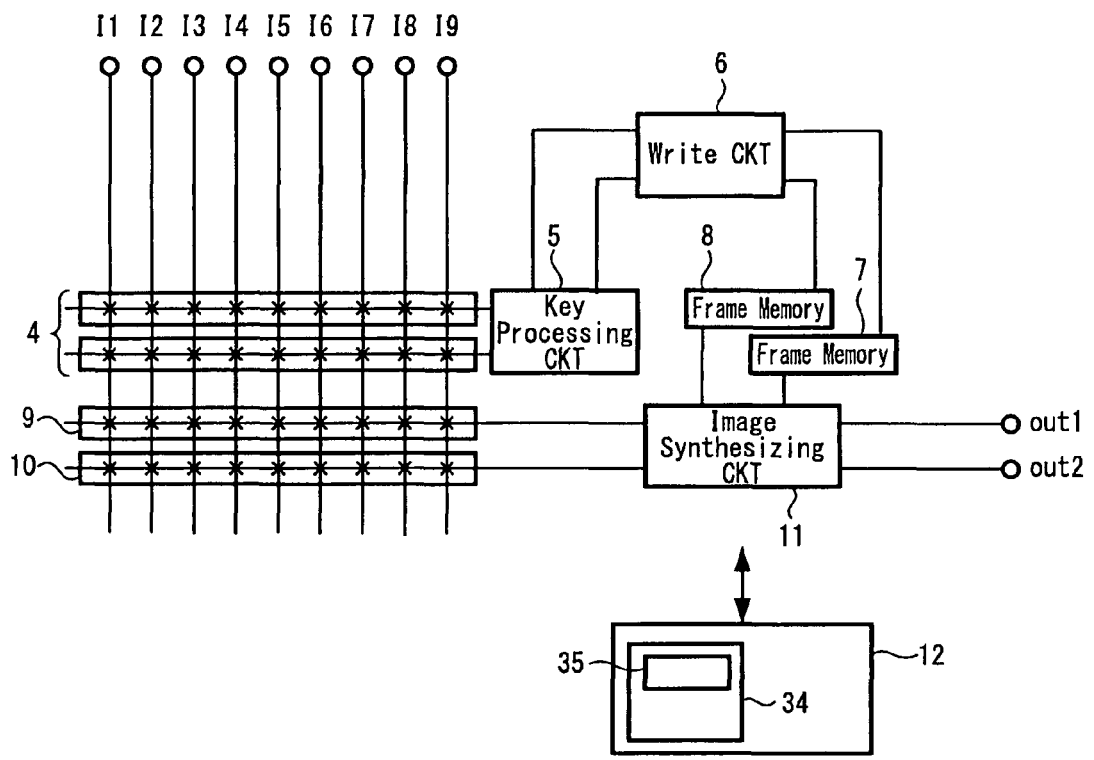
FIG. 14 is a diagram showing a modification to the configuration of the main unit shown in FIG. 2.

FIG. 14 also shows a modification to the configuration of the main unit 1. Circuits that are the same as in FIG. 2 have been assigned the same reference numerals. In this modification, a memory 34 inside the microcomputer 12 of the main unit 1 is provided with a region for storing a table 35 in which a plurality of pieces of information showing the correspondences between the input lines I1 to I9 and the storage regions of the frame memories 7 and 8 are stored.

Although not illustrated, the following buttons (1) and (2) are provided on the operation unit 13 (see FIG. 2) of the operation panel 2.

(1) A register button for registering the correspondence between an input line selected by the key image selecting switch 4 out of the input lines I1 to I9 (i.e., an input line selected using a key selecting button of the operation unit 13) and storage regions, out of the storage regions of the frame memories 7 and 8, where the image signal inputted on that input line is written.

(2) A recreate button for recreating a correspondence that has been registered using the register button.

Every time a signal indicating that the register button has been operated is sent from the microcomputer 14 (see FIG. 2) of the operation panel 2, the microcomputer 12 of the main unit 1 stores information in the table 35. The information shows the correspondence between the input line that is presently selected by the key image selecting switch 4 and storage regions, out of the storage regions of the frame memories 7 and 8, in which the image signal inputted on the selected input line has been written.

Also, in accordance with an operation of the recreate button and an input line having been selected by the key image selecting switch 4 (i.e., by operating a key selecting button), the microcomputer 12 of the main unit 1 sends a command to the write circuit 6. The command is sent for carrying out a write into storage regions out of the storage regions of the frame memories 7 and 8 that correspond to the selected input line in the information in the table 35.

According to the modification, based on both the key selecting button and the GUI screen shown in FIG. 3 having been operated in the past, the correspondence between an input line and the storage regions of the frame memories 7 and 8 can be subsequently recreated by merely operating a key selecting button without having to operate the GUI screen shown in FIG. 3. Accordingly, there is a significant improvement in operability when selecting the same key fill signal and key source signal as a previous selection. Note that as yet another modification, it is also possible to provide a function that selects an input line for the key image selecting switch 4 and instructs the write circuit 6 by merely operating the recreate button. In this case, an input line may be selected for the key image selecting switch 4, and the write circuit 6 may be instructed to write in each frame for a limited storage region or for a plurality of storage regions, with every storage region being processed once in order.

Modification 6

Figure 15:
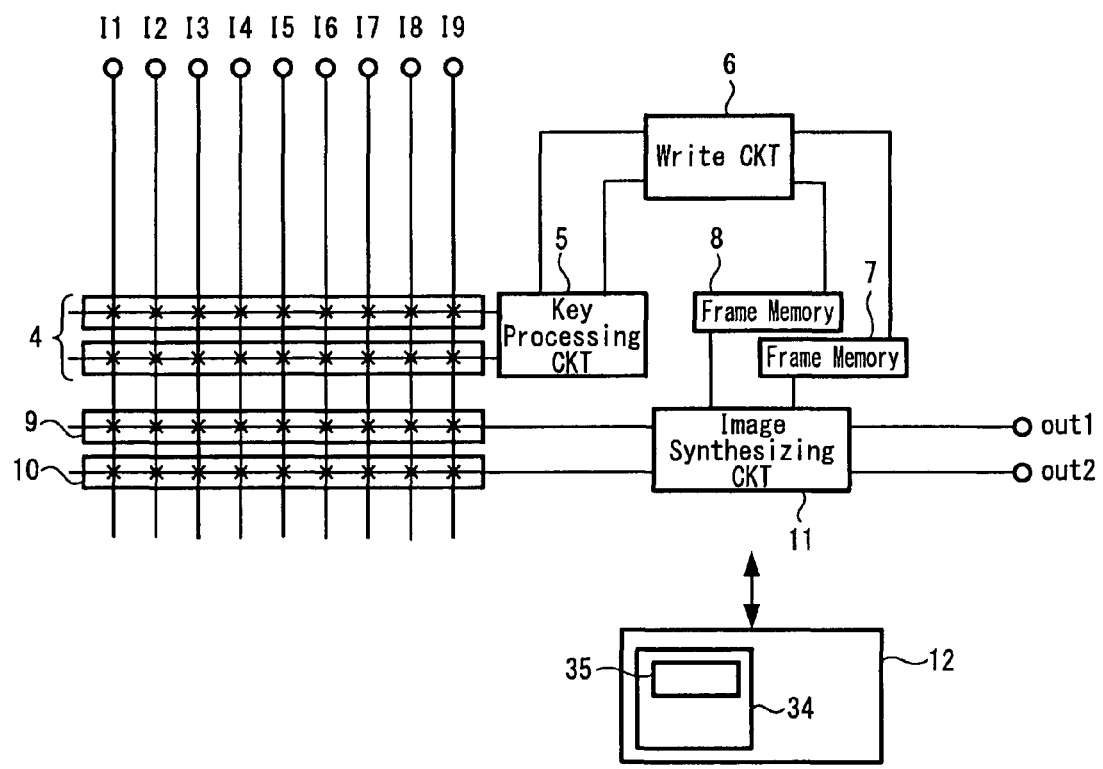
FIG. 15 is a diagram showing a modification to the configuration of the main unit shown in FIG. 2.

FIG. 15 is a drawing showing a modification to the configuration of the main unit 1. Circuits that are the same as in FIG. 2 and FIG. 14 have been assigned the same reference numerals. In this modification, the internal memory 34 of the microcomputer 12 of the main unit 1 is provided with a region for a table 36 for storing a plurality of pieces of information showing correspondences between the input lines I1 to I9 and the regions of the graphic 21 on the GUI screen shown in FIG. 3.

Although not illustrated, the following buttons (1) to (3) are provided on the operation unit 13 (see FIG. 2) of the operation panel 2.

(1) A register button for registering a plurality of correspondences between input lines selected out of the input lines I1 to I9 by the key image selecting switch 4 (i.e., selected using a key selecting button of the operation unit 13) and regions designated in the graphic 21 on the GUI screen shown in FIG. 3.

(2) A cyclical updating button for cyclically repeating the plurality of correspondences registered using the register button to update the stored content of the frame memories 7 and 8.

(3) A stop updating button for stopping the updating of the frame memories 7 and 8 by the cyclical updating button.

Every time a signal indicating that the register button has been operated is sent from the microcomputer 14 (see FIG. 2) of the operation panel 2, the microcomputer 12 of the main unit 1 stores information in the table 36. The information shows the correspondence between an input line presently selected using the key image selecting switch 4 and region(s) presently selected using the graphic 21 on the GUI screen shown in FIG. 3.

Figure 16:
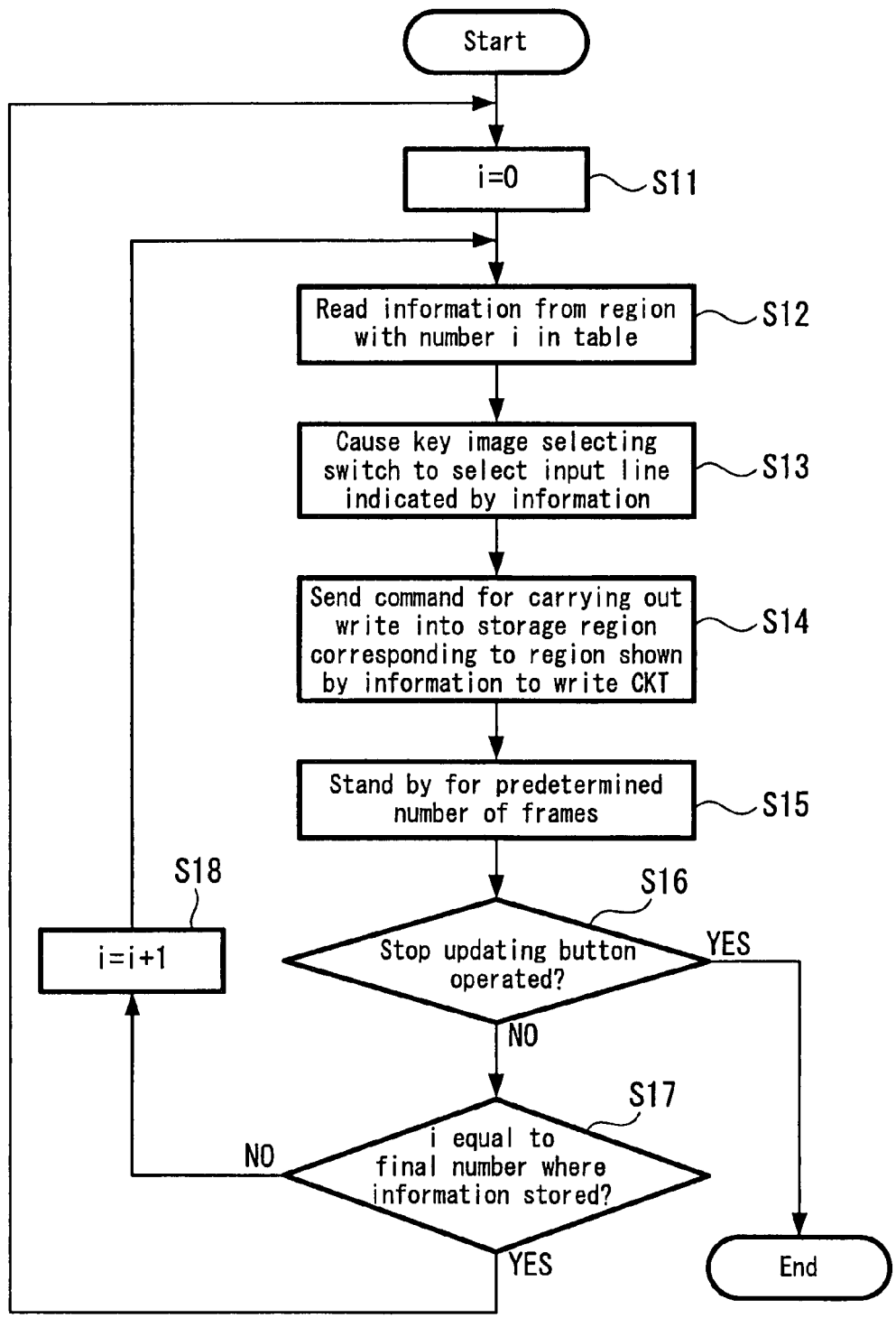
FIG. 16 is a flowchart showing a process executed by a microcomputer of a main unit for the modification shown in FIG. 15.

In response to a signal indicating that the cycling updating button has been operated having been sent from the microcomputer 14 of the operation panel 2, the microcomputer 12 of the main unit 1 carries out a process such as that shown in FIG. 16.

In the process, the value of a variable i that shows the number of a region in which information on the correspondence described earlier is stored inside the table 36 is set at zero, which is the number of the first region (step S11). Next, information is read from the region with the number i inside the table 36 (step S12).

Next, the key image selecting switch 4 is controlled to select the image signal inputted on the input line shown by the information read in step S12 out of the input lines I1 to I9 (step S13). Also, a command for carrying out writes into the storage region(s) corresponding to the region of the screen shown by the information read in step S12 is sent to the write circuit 6 (step S14).

Next, the apparatus stands by until the time of a predetermined number of frames (for example, one frame or several frames) has elapsed (step S15) and it is determined whether a signal indicating that the stop updating button described earlier has been operated has been sent from the microcomputer 14 of the operation panel 2 (step S16).

If the determination in step S16 is no, it is then determined whether the present value of the variable i is equal to the number of the final region in the table 36 in which information is stored (step S17). If the determination in step S17 is no, the value of the variable i is incremented by one (step S18) and the processing returns to step S12. On the other hand, if the determination in step S17 is yes, the processing returns to step S11. If the determination in step S16 is yes, the processing ends.

Figures 17A, 17B:
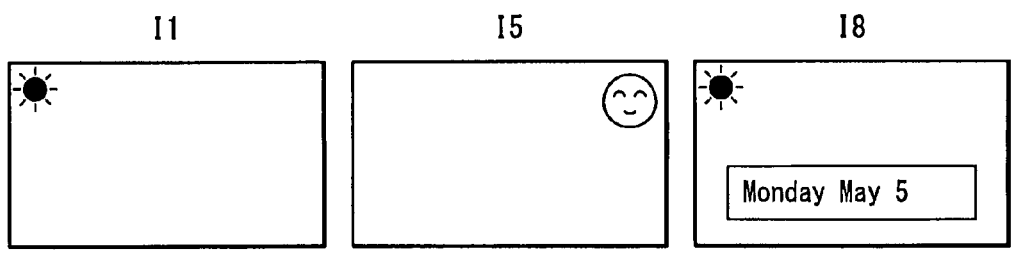
FIGS. 17A and 17B are diagrams showing an example of the stored content of a table for the modification shown in FIG. 15.

Next, an example of superimposing foreground images on the background image by the modification 6 will be described. As shown in FIG. 17A, out of the input lines I1 to I9, an image signal (video) in which a picture of the sun is displayed in only the upper left region of the screen is inputted on the input line I1. Further, an image signal (video) where a picture of a facial expression is displayed in only the upper right region of the screen is inputted on the input line I5. Furthermore, an image signal (video) where characters showing the date, such as "Monday May 5", are surrounded by a frame is displayed in only the lower region of the screen is inputted on the input line I8.

Here, assume that the operator has first operated the register button in a state where the image signal on the input line I1 has been selected using a key selecting button of a certain keyer that is disposed on the operation unit 13 (see FIG. 2) and the upper left region of the graphic 21 on the GUI screen shown in FIG. 3 for that keyer has been designated.

Subsequently, assume that the operator has operated the register button in a state where the image signal on the input line I5 has been selected using the key selecting button and the upper right region of the graphic 21 on the GUI screen shown in FIG. 3 for that keyer has been designated.

Next, assume that the operator has operated the register button in a state where the image signal on the input line I8 has been selected using the key selecting button and the lower region (i.e., the lower left region and the lower right region) of the graphic 21 on the GUI screen shown in FIG. 3 for that keyer has been designated.

In response, as shown in FIG. 17B, pieces of information are stored in the table 36 (see FIG. 15). Specifically, the information that associates the input line I1 and the upper left region of the screen is stored in the first region that is numbered zero. The information that associates the input line I5 and the upper right region of the screen is stored in the second region that is numbered one. The information that associates the input line I8 and the lower left region and lower right region of the screen is stored in the third region that is numbered two.

FIGS. 18A to 18L are diagrams showing how the key fill signal and the key source signal written in the frame memories 7 and 8 change when the cyclical updating button has been operated in a state where the information described above has been stored in the table 36. After the cyclical updating button has been operated, the processing steps from S12 to S18 shown in FIG. 16 are repeated until the value of the variable i has changed from zero to two. Then, as shown in FIG. 18A, key fill signals and key source signals are written in the frame memories 7 and 8 for superimposing the three foreground images that are the picture of the sun, the picture of the facial expression, and the characters showing the date surrounded by the frame in the upper left region, the upper right region, and the lower region respectively of the screen.

Next, after the time of a predetermined number of frames has elapsed in step S15 in FIG. 16, the determination in step S17 becomes yes and the value of the variable i is set at zero again in step S11. After this, by carrying out steps S13 and S14, as shown in FIG. 18B, out of the key fill signals and the key source signals written in the frame memories 7 and 8, only the key fill signal and the key source signal for superimposing the picture of the sun in the upper left region of the screen are updated to a key fill signal and a key source signal for superimposing the image on the input line I1 in the present frame (here, a picture where the brightness of the sun has become weaker).

Next, after the time of a predetermined number of frames has elapsed in step S15 in FIG. 16, the value of the variable i is incremented to one in step S18 and the processing returns to step S12. After this, by carrying out steps S13 and S14, as shown in FIG. 18C, out of the key fill signals and the key source signals written in the frame memories 7 and 8, only the key fill signal and the key source signal for superimposing the picture of the facial expression in the upper right region of the screen are updated to a key fill signal and a key source signal for superimposing the image on the input line I5 in the present frame (here, a picture where the facial expression has changed).

Next, after the time of a predetermined number of frames has elapsed in step S15 in FIG. 16, the value of the variable i is incremented to two in step S18 and the processing returns to step S12. After this, by carrying out steps S13 and S14, as shown in FIG. 18D, out of the key fill signals and the key source signals written in the frame memories 7 and 8, only the key fill signal and the key source signal for superimposing the characters for the date surrounded by the frame in the lower region of the screen are updated to a key fill signal and a key source signal for superimposing the image on the input line I8 in the present frame (here, an image where the May 5 part of the date has been underlined).

Next, after the time of a predetermined number of frames has elapsed in step S15 in FIG. 16, the determination in step S17 becomes yes and the value of the variable i is set at zero again in step S11. After this, the same process is repeated until the stop updating button has been operated. Therefore, as shown in FIG. 18E and subsequent figures, the key fill signal and the key source signal for superimposing the picture of the sun in the upper left region of the screen, those signals for superimposing the picture of the facial expression in the upper right region of the screen, and those signals for superimposing the characters of the date in the lower region of the screen are cyclically updated to the signals for superimposing images in the present frame.

In the modification, as shown in FIGS. 18A to 18L, the key fill signals and the key source signals for a plurality of foreground images written in the frame memories 7 and 8 are cyclically updated. Hence, the key fill signals and the key source signals for the individual foreground images are intermittently updated, so that it is possible to simultaneously superimpose a plurality of video foreground images with a low frame rate onto the background image. Accordingly, the additional value of images can be significantly increased.

Note that in the modification, during the period from when the cyclic updating button is operated until the stop updating button is operated, the microcomputer 14 of the operation panel 2 carries out control to illuminate every button out of the key selecting buttons that was used to select an image signal when the register button was operated.

Figure 19:
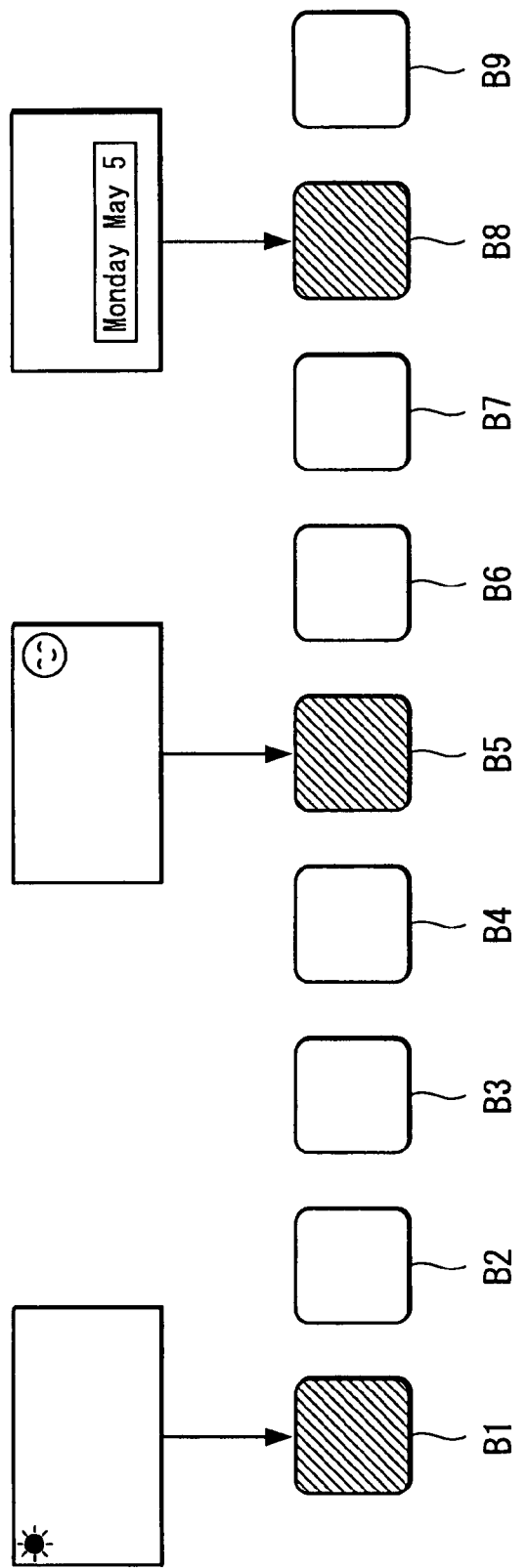
FIG. 19 is a diagram showing a modification to illumination control of the key selecting buttons for the modification shown in FIG. 15.

FIG. 19 is a diagram showing how illumination control is carried out for the example in FIGS. 17A and 17B described earlier. Out of the key selecting buttons B1 to B9 (nine examples of buttons that one-to-one correspond to the input lines I1 to I9 in FIG. 2), the button B1 corresponding to the input line I1, the button B5 corresponding to the input line I5, and the button B8 corresponding to the input line I8 are illuminated using the same color (in the drawings, the illumination color is shown by oblique shading).

Such illumination control is carried out for the key selecting buttons for the following reason. With the key selecting buttons of a typical effect switcher, only the button of the image signal that is presently selected is illuminated. However, with the effect switcher according to an embodiment of the present invention, image signals on a plurality of input lines are simultaneously used as foreground images by a single keyer. Accordingly, if a typical illumination method were used, it would not be possible to confirm which image signals on the input lines are being used, which would be inconvenient for the operator. Further, with this modification, although the key image selecting switch 4 switches the selection at high speed (at intervals of predetermined frames in step S15 of FIG. 16), it is difficult to switch the illumination of the key selecting buttons at high speed in keeping with such switching. For this reason, all of the buttons corresponding to image signals selected when the register button was operated are illuminated. By doing so, the operator can easily confirm which image signals on the input lines are being used as the plurality of foreground images.

Although B1, B5, and B8 are illuminated in the same color in FIG. 19, in the example in FIGS. 17A and 17B, the button B8 of the last image signal to be selected may be illuminated in a different color to the buttons B1 and B5.

When foreground images are superimposed on a background image by the operation in FIGS. 4A to 6D described earlier, in the same way, every button out of the key selecting buttons that was used to select an image signal for use as a foreground image may be simultaneously illuminated. In addition, when foreground images are superimposed on a background image by the operations in FIGS. 4A to 6D, out of the key selecting buttons, the buttons of image signals that were selected when the temporary write button 22 was clicked and the buttons of image signals that were selected when the continuous write button 23 was clicked may be illuminated in different colors. Alternatively, illuminating only the buttons of image signals selected when the continuous write button 23 was clicked and extinguishing the buttons of image signals selected when the temporary write button 22 was clicked is effective in giving an "on air" notification of where image signals are being inputted.

Modification 7

Figure 20:
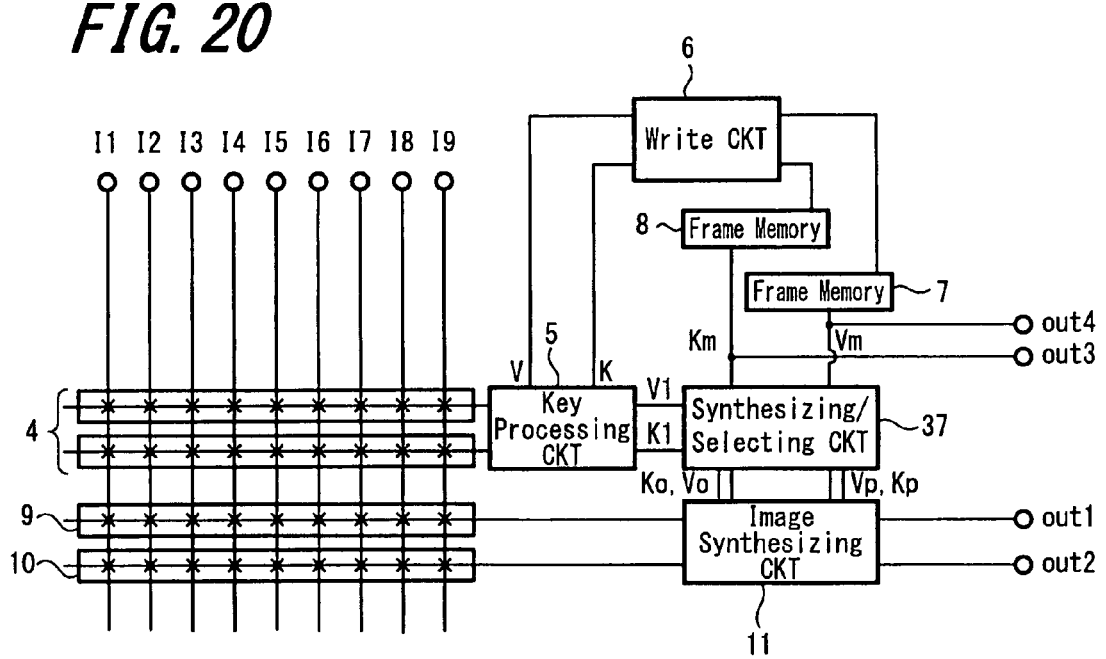
FIG. 20 is a diagram showing a modification to the configuration of the main unit shown in FIG. 2.

FIG. 20 is a diagram showing a modification to the configuration of the main unit 1. Circuits that are the same as in FIG. 2 have been assigned the same reference numerals. In this modification, a synthesizing/selecting circuit 37 is provided in the input circuit for inputting into the image synthesizing circuit 11. The synthesizing/selecting circuit 37 sends a key fill signal Vm and a key source signal Km read from the frame memories 7 and 8 unchanged to the image synthesizing circuit 11 as a key fill signal Vo and a key source signal Ko. Further, the synthesizing/selecting circuit 37 sends a key fill signal Vp and a key source signal Kp, which are produced by combining a key fill signal V1 and a key source signal K1 from the key processing circuit 5 with the key fill signal Vm and key source signal Km, to the image synthesizing circuit 11.

The image synthesizing circuit 11 superimposes foreground images using the key fill signal Vo and the key source signal Ko onto the program image from the background image selecting switch 9 and superimposes foreground images using the key fill signal Vp and the key source signal Kp onto the reset image from the background image selecting switch 10 and outputs the result from the preview output line out2.

The key fill signal Vm and the key source signal Km read from the frame memories 7 and 8 are also outputted unchanged to the periphery from the output lines out3, out4.

According to the modification, preview images outputted from the preview output line out2 are viewed on a monitor before the key fill signal and the key source signal that have been adjusted and processed by the key processing circuit 5 are written in the frame memories 7 and 8 (i.e., before the temporary write button 22 or continuous write button 23 is clicked in the GUI screen shown in FIG. 3). Therefore, it is possible to confirm how the program image will look after the key fill signal and the key source signal are written in the frame memories 7 and 8.

Accordingly, it is possible to confirm whether the image is as expected and to carry out writing into the frame memories 7 and 8 only after confirming that the image is as expected. By doing so, since it will not be necessary to delete the key fill signal and the key source signal from the frame memories 7 and 8 (i.e., to click the clear part button 26 in the GUI screen shown in FIG. 3) due to the program image not being as expected when viewed on a monitor after writing, there is a significant improvement in operability.

Note that in the examples shown in FIGS. 8A to 8D and 17A and 17B, key fill signals and key source signals for foreground images that occupy regions that are only parts of the screen are selected. However, when a key fill signal and a key source signal for a foreground image that occupies the entire screen are selected, a mask function incorporated in the key processing circuit 5 is used. By using this function, the key fill signal and the key source signal in a region that is only part of the screen are outputted from the key processing circuit 5. Accordingly, it will be possible to obtain a preview image that is the same as the program image for the case where the write into the frame memories 7 and 8 is limited to a region or regions using the graphic 21 in the GUI screen shown in FIG. 3.

The configuration of the modification can be used for other applications aside from previews. Since an image signal is obtained where the storage content of the frame memories 7 and 8 and the output of the key processing circuit 5 have been synthesized, the stored contents of the frame memories and the output of the key processing circuit 5 can be synthesized across the entire screen and the result then superimposed on the program image. In this way, a process that would require at least two keyers with a typical effect switcher can be realized with a simple configuration.

Further, the key fill signals and the key source signals read from the frame memories 7 and 8 are outputted to the periphery in addition to the program image and preview image on which foreground images have been superimposed by the image synthesizing circuit 11. Therefore, the key fill signals and key source signals used for superimposing the foreground images can themselves be used by a peripheral apparatus, recorded by a VTR (video tape recorder), and the like.

Figure 21:
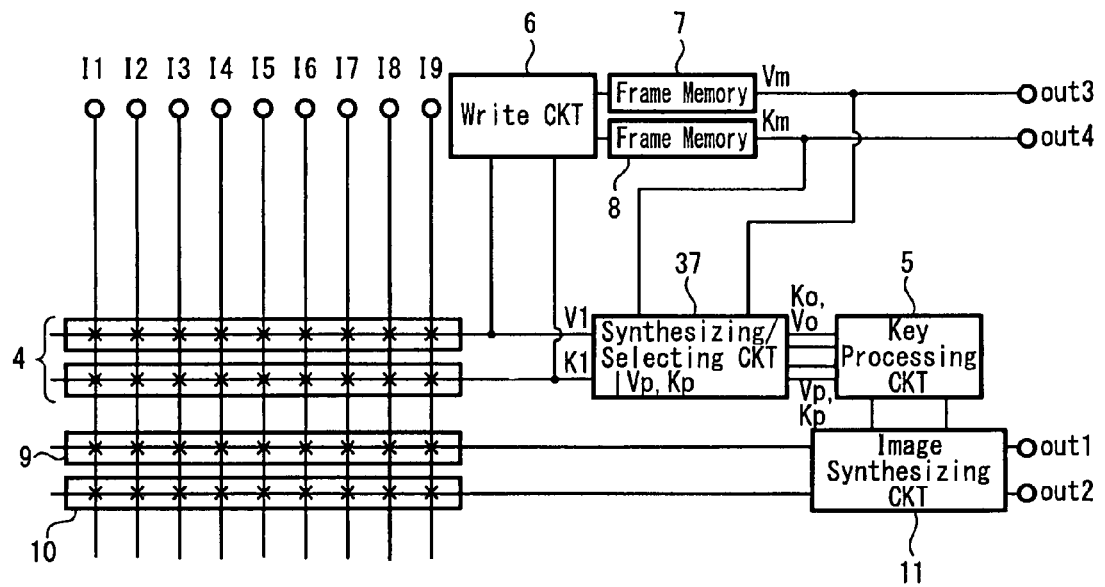
FIG. 21 is a diagram showing a modification to the configuration of the main unit shown in FIG. 2.

FIG. 21 shows an example where the synthesizing/selecting circuit 37 is provided in the same way as in FIG. 20 in the modification shown in FIG. 10 (i.e., the modification where the frame memories 7 and 8 are provided upstream of the key processing circuit 5). With this configuration, the synthesizing/selecting circuit 37 is present upstream of the key processing circuit 5. Therefore, if a key fill signal and a key source signal for a foreground image that occupies the entire screen are selected, it will not be possible to limit the supplying of the key fill signal and the key source signal to the synthesizing/selecting circuit 37 to a region that is only part of the screen.

Another Effect Switcher According to an Embodiment of the Present Invention

Figure 22:
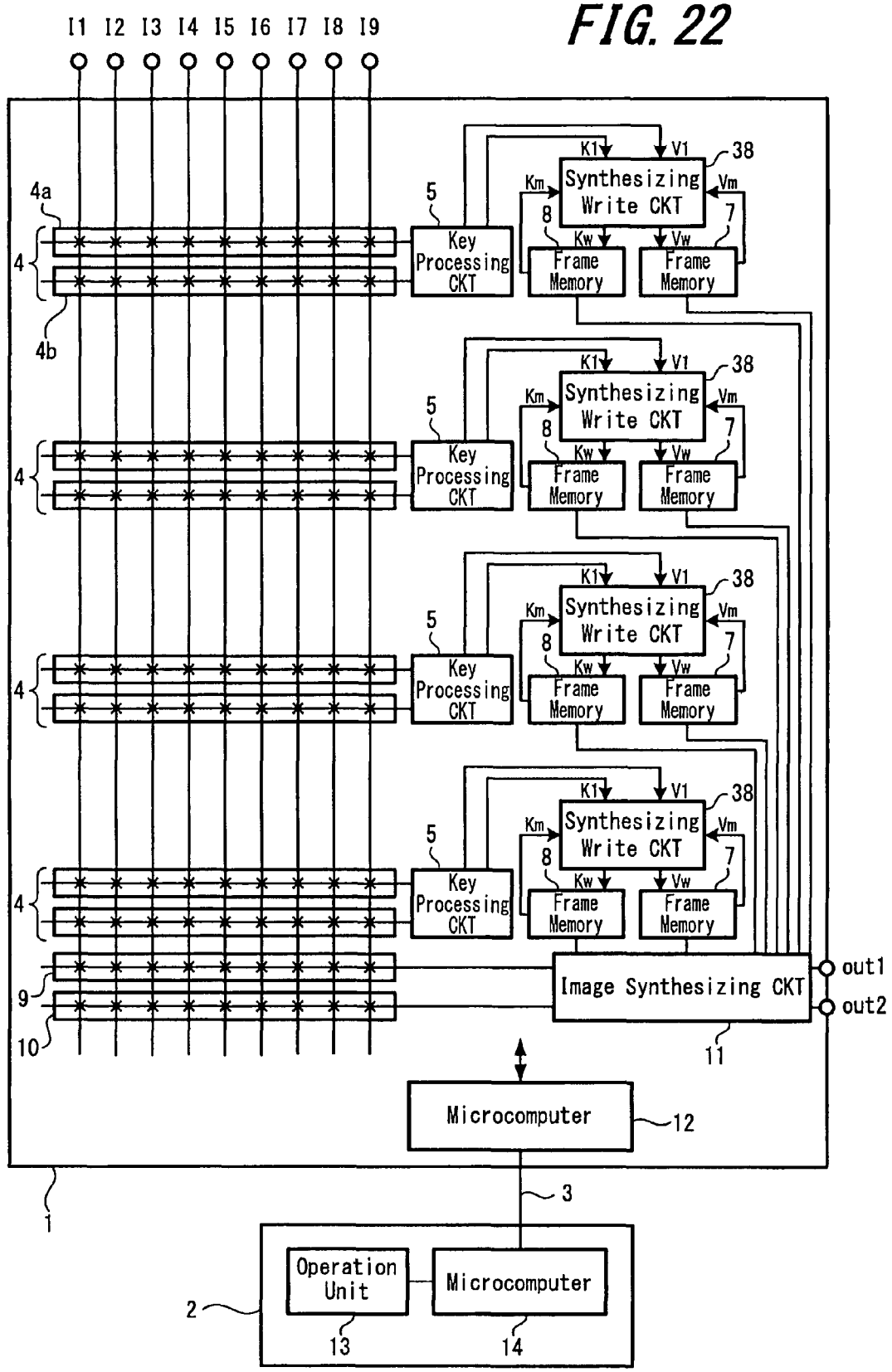
FIG. 22 is a diagram showing an example of the overall configuration of an effect switcher according to another embodiment of the present invention.

Next, another effect switcher according to an embodiment of the present invention will be described. FIG. 22 is a block diagram showing an example of a configuration of this effect switcher, with circuits that are the same as in FIG. 2 having been assigned the same reference numerals and duplicated description thereof omitted.

In this effect switcher, the main unit 1 and the operation panel 2 are connected by the communication channel 3. The main unit 1 is provided with four keyers each including a key image selecting switch 4 and a key processing circuit 5, background image selecting switches 9 and 10, an image synthesizing circuit 11, and a microcomputer 12 that controls the various components inside the main unit 1. The operation panel 2 has an operation unit 13 that is to be operated by the operator provided on a panel surface and is also provided with a microcomputer 14.

A synthesizing write circuit 38 and frame memories 7 and 8 are provided for and associated with each keyer. In each keyer, the key fill signal V1 and key source signal K1 that have been adjusted and processed by the key processing circuit 5 are sent to the synthesizing write circuit 38. A key fill signal Vw and a key source signal Kw are sent from the synthesizing write circuit 38 to the frame memories 7 and 8, respectively.

The key fill signal and key source signal read from all of the storage regions for each frame are sent from the frame memories 7 and 8 to the image synthesizing circuit 11. Also, as described later, based on control by the synthesizing write circuit 38, a key fill signal Vm and a key source signal Km read from every storage region of the frame memories 7 and 8 are synchronized in frames with a key fill signal V1 and a key source signal K1 from the key processing circuit 5 and one frame is sent to the synthesizing write circuit 38.

A GUI screen for superimposing foreground images such as that shown in FIG. 3 is not provided on the operation unit 13 of the operation panel 2. However, although not illustrated, the following buttons (1) and (2) are provided for each keyer.

(1) A clear button for deleting all of the stored content of the frame memories 7 and 8.

(2) A keying write designating button for writing the key fill signal and key source signal selected using a key selecting button into the frame memories 7 and 8 by keying.

When a signal indicating that the clear button has been operated for any of the keyers has been sent from the microcomputer 14 of the operation panel 2, the microcomputer 12 of the main unit 1 sends a command to the synthesizing write circuit 38 associated with the relevant keyer. The command is sent for writing a signal with the value zero (i.e., a black image signal) into every storage region of the frame memories 7 and 8. When this command has been sent, the synthesizing write circuit 38 writes a signal with the value zero into every storage region of the frame memories 7 and 8.

Figure 23:
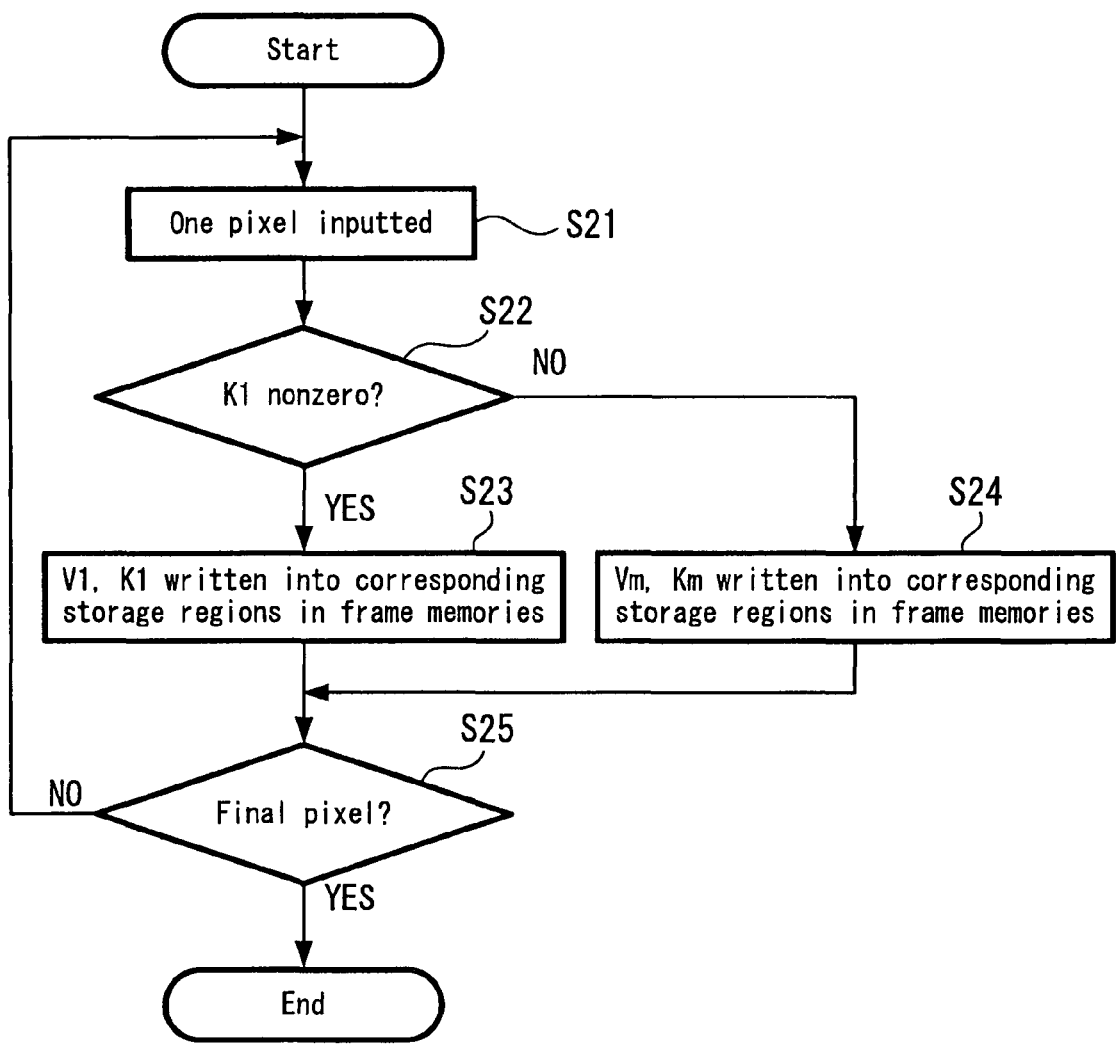
FIG. 23 is a flowchart showing a process executed by a synthesizing write circuit based on an operation of a keying write designating button.

When a signal indicating that the keying write designating button has been operated for any of the keyers has been sent from the microcomputer 14 of the operation panel 2, the microcomputer 12 of the main unit 1 sends a command for carrying out a keying write to the synthesizing write circuit 38 associated with the relevant keyer. When this command is sent, the synthesizing write circuit 38 reads one frame of the key fill signal Vm and key source signal Km from every storage region of the frame memories 7 and 8 in synchronization with a frame of the key fill signal V1 and the key source signal K1 from the key processing circuit 5. Subsequently, a keying write process such as that shown in FIG. 23 is carried out for one frame.

In the process, whenever one pixel of the key fill signal V1, the key source signal K1, the key fill signal Vm, and key source signal Km that have been synchronized together in frames is inputted (step S21), it is determined whether the value of the key source signal K1 at that pixel position is non-zero (step S22).

If the determination is yes, the key fill signal V1 and the key source signal K1 for one pixel from the key processing circuit 5 are sent to the frame memories 7 and 8 as the key fill signal Vw and the key source signal Kw respectively and are written into the storage regions corresponding to the present pixel position in the frame memories 7 and 8 (step S23). After this, the processing proceeds to step S25.

On the other hand, if the determination in step S22 is no, the key fill signal Vm and the key source signal Km for one pixel from the frame memories 7 and 8 are sent to the frame memories 7 and 8 as the key fill signal Vw and the key source signal Kw respectively and are written into the storage regions corresponding to the present pixel position in the frame memories 7 and 8 (step S24). After this, the processing proceeds to step S25.

In step S25, it is determined whether the key fill signal V1, the key source signal K1, the key fill signal Vm, and key source signal Km for the final pixel in one frame have been inputted (step S25). If the determination is no, the processing in step S21 onwards is repeated. If the determination in step S25 is yes, the processing is terminated.

FIGS. 24A to 24D and 25A to 25D are diagrams showing examples of how the key fill signal and the key source signal are written in the frame memories 7 and 8 by such keying write process.

Figure 24A:
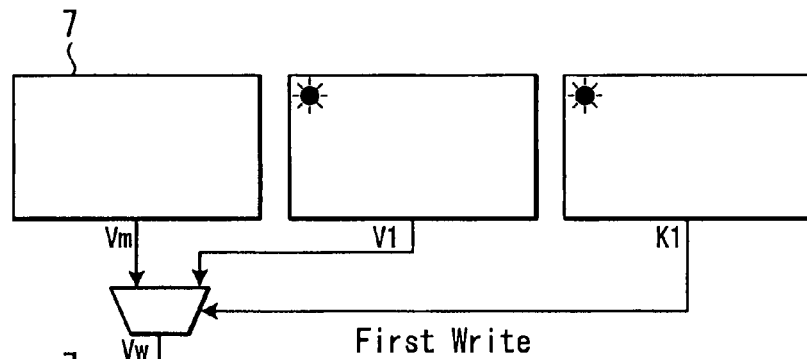
FIGS. 24A to 24D are diagrams showing examples in which key fill signals are written into a frame memory by a keying write process.
Figure 25A:
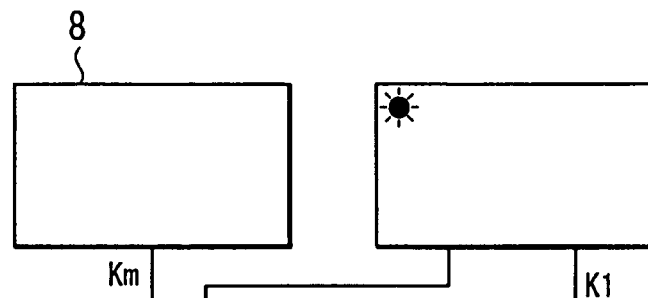
FIGS. 25A to 25D are diagrams showing examples in which key source signals are written into a frame memory by a keying write process.

FIGS. 24A and 25A show a state where after the entire stored contents of the frame memories 7 and 8 have been deleted by the clear button described earlier, an image signal for displaying a picture of the sun in only the upper left region of the screen has been selected using a key selecting button and then the keying write designating button has been operated to carry out a first write into the frame memories 7 and 8. (Note that when the entire stored contents are deleted as described above, although a black image signal is written into every storage region of the frame memories 7 and 8, for ease of illustration white areas in the drawings correspond to the parts with the black image signal.)

In this state, in the key source signal K1 from the key processing circuit 5, the value is nonzero (for example, 100%) at only the pixel positions of the picture of the sun and the values of the other pixel positions are all zero (a black image signal). Accordingly, at the pixel positions of the picture of the sun, the processing proceeds to step S23 in FIG. 23 and the key fill signal V1 and key source signal K1 from the key processing circuit 5 are written into the frame memories 7 and 8 as the key fill signal Vw and the key source signal Kw respectively. On the other hand, at the other pixel positions, the processing proceeds to step S24 in FIG. 23 and the key fill signal Vm and key source signal Km from the frame memories 7 and 8 are written back into the frame memories 7 and 8 as the key fill signal Vw and the key source signal Kw respectively (in other words, the stored contents of the frame memories 7 and 8 are not updated).

Subsequently, as shown at the left parts of FIGS. 24B and 25B, an image signal of a picture of the sun is written into only storage regions of the frame memories 7 and 8 corresponding to the upper left region of the screen.

Figure 24B:
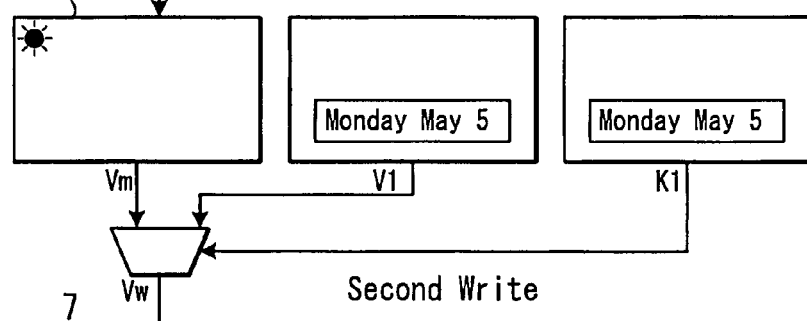
Figure 25B:
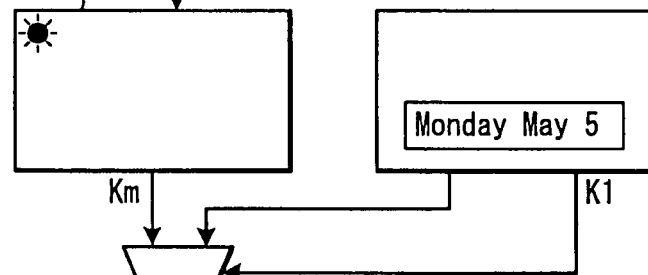

Next, as shown by the centers and right parts of FIGS. 24B and 25B, assume that an image signal for displaying the characters "Monday May 5" surrounded by a rectangular frame in only a lower region of the screen has been selected using a key selecting button and then the keying write designating button has been operated to carry out a second write into the frame memories 7 and 8.

In this state, in the key source signal K1 from the key processing circuit 5, the value is nonzero (for example, 100% for the character part and 50% for the noncharacter part inside the frame, although for ease of illustration, the character background inside the frame has been shown as white) at only the pixel positions inside the frame surrounding the characters and the values of the other pixel positions are all zero. Accordingly, at the pixel positions inside the frame, the processing proceeds to step S23 in FIG. 23 and the key fill signal V1 and key source signal K1 from the key processing circuit 5 are written into the frame memories 7 and 8 as the key fill signal Vw and the key source signal Kw, respectively. On the other hand, at the other pixel positions, the processing proceeds to step S24 in FIG. 23 and the key fill signal Vm and key source signal Km from the frame memories 7 and 8 are written back into the frame memories 7 and 8 as the key fill signal Vw and the key source signal Kw respectively (in other words, the stored contents of the frame memories 7 and 8 are not updated).

Figure 24C:
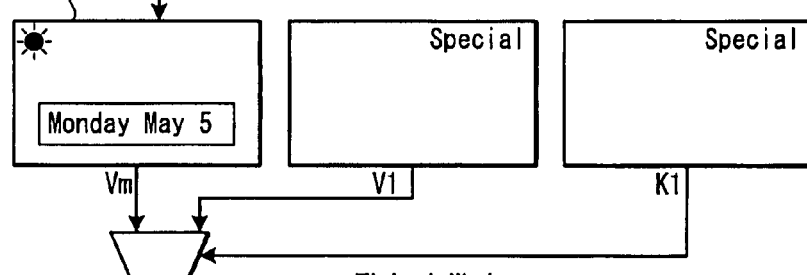
Figure 25C:
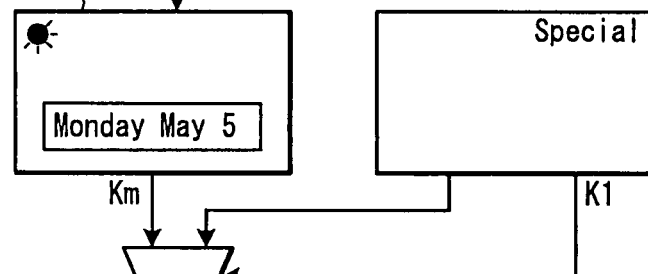

Accordingly, as shown at the left parts of FIGS. 24C and 25C, an image signal of the characters "Monday May 5" surrounded by a rectangular frame is newly written into storage regions of the frame memories 7 and 8 corresponding to the lower region of the screen.

Next, as shown by the center and the right parts of FIGS. 24C and 25C, assume that an image signal for displaying the characters "Special" in only an upper right region of the screen has been selected using a key selecting button and then the keying write designating button has been operated to carry out a third write into the frame memories 7 and 8.

In this state, in the key source signal K1 from the key processing circuit 5, the value is nonzero (for example, 100%) at only the pixel positions of the characters "Special" and the values of the other pixel positions are all zero. Accordingly, at the pixel positions of the characters "Special", the processing proceeds to step S23 in FIG. 23 and the key fill signal V1 and key source signal K1 from the key processing circuit 5 are written into the frame memories 7 and 8 as the key fill signal Vw and the key source signal Kw, respectively. On the other hand, at the other pixel positions, the processing proceeds to step S24 in FIG. 23 and the key fill signal Vm and key source signal Km from the frame memories 7 and 8 are written back into the frame memories 7 and 8 as the key fill signal Vw and the key source signal Kw respectively (in other words, the stored contents of the frame memories 7 and 8 are not updated).

Figure 24D:
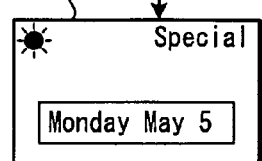
Figure 25D:
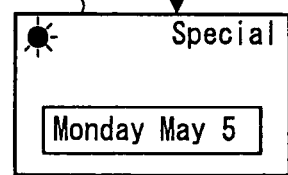

Accordingly, as shown in FIGS. 24D and 25D, an image signal of the characters "Special" is newly written into only storage regions of the frame memories 7 and 8 corresponding to the upper right region of the screen. In this way, key fill signals and key source signals are written into the frame memories 7 and 8 to superimpose three foreground images that are a picture of the sun, the characters "Special" and characters showing the date respectively onto an upper left region, an upper right region, and a lower region of the screen.

As a result, in the image synthesizing circuit 11, the key fill signals and the key source signals from the frame memories 7 and 8 are used to superimpose a picture of the sun, the characters "Special" and characters showing the date respectively onto an upper left region, an upper right region, and a lower region of the background image.

As described above, with the effect switcher according to the embodiment, it is possible to simultaneously superimpose a plurality of foreground images onto the background image using a single keyer. The present effect switcher is economical in that it is possible to simultaneously superimpose a larger number of foreground images using little hardware while suppressing the number of keyers to four as in the typical effect switcher shown in FIG. 1. Also, aside from providing storage regions for storing parts of the key fill signals and key source signals of a plurality of foreground images according to the embodiments of the present invention, the frame memories can be used for other applications, such as for enlarging and reducing images. Using the frame memories 7 and 8 for multiple purposes in this way is more economical than providing separate frame memories.

In addition, with the present effect switcher, the key fill signal and key source signals for a plurality of foreground images that occupy different regions on the screen can be written into different storage regions of the frame memories 7 and 8 by keying writes without the operator having to perform an operation that designates regions in the screen one at a time.

Note that as shown in FIGS. 24A and 25A, at the stage when the first write is carried out after the entire stored content of the frame memories 7 and 8 has been deleted, the key fill signal V1 and the key source signal K1 may be written into the frame memories 7 and 8 as the key fill signal Vw and key source signal Kw at every pixel position regardless of the value of the key source signal K1. The result of writing into the frame memories 7 and 8 will be the same as when the key fill signal V1 and the key source signal K1 are written into the frame memories 7 and 8 as the key fill signal Vw and key source signal Kw at only pixel positions where the value of the key source signal K1 is nonzero (i.e., the state shown by the left parts of FIGS. 24B and 25B).

Hence, as a modification to the keying write process shown in FIG. 23, it is possible to determine whether the process is the first process after a signal with the value zero has been written into every storage region of the frame memories 7 and 8 in accordance with an operation of the clear button described earlier, and when the process is the first process to then skip step S22, always execute step S23, and proceed to step S25. Also, since all of the signals are newly written by such a first write operation, such operation may have the same effect as the clear button.

Figure 26:
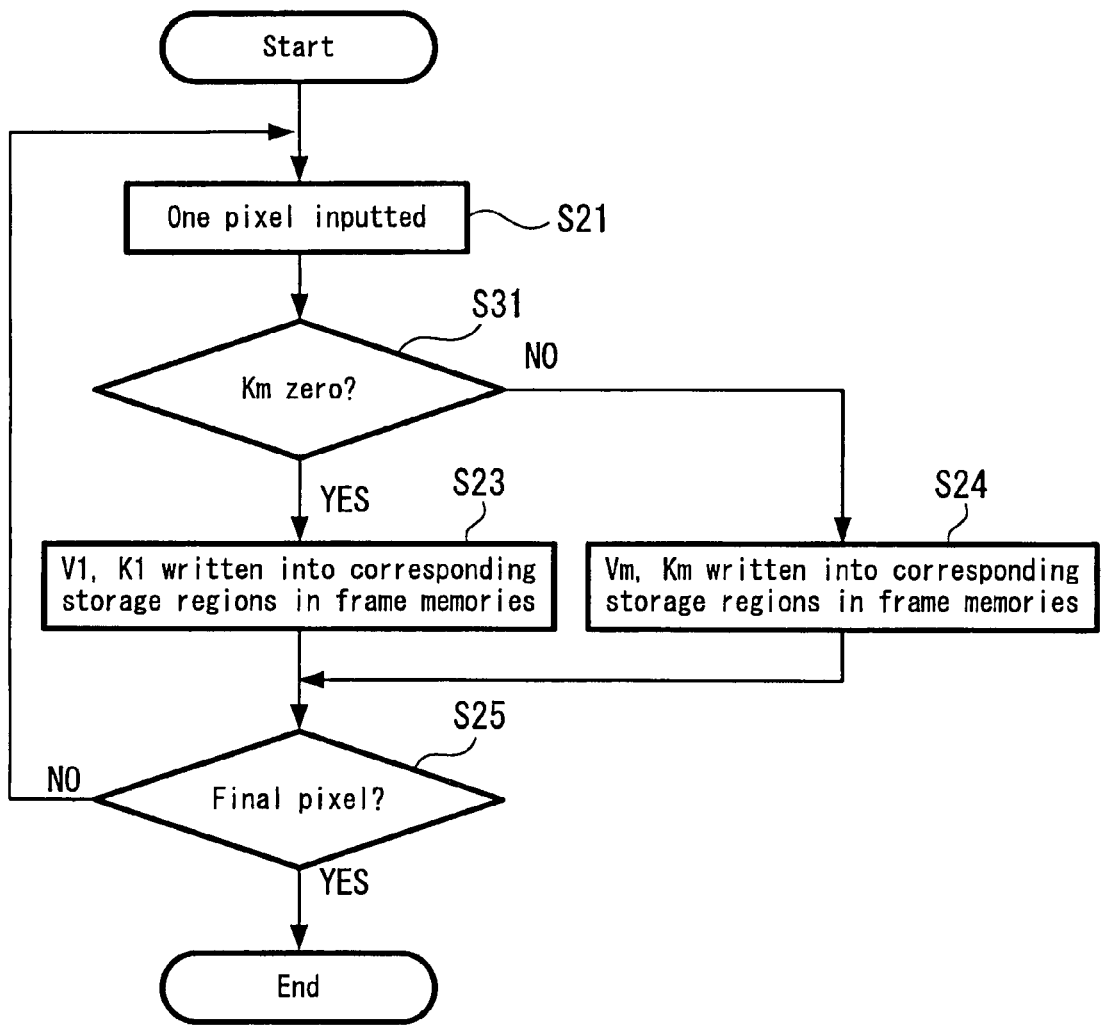
FIG. 26 is a flowchart showing another example of a process executed by a synthesizing write circuit based on an operation of a keying write designating button.

As yet another modification to the keying write process, as shown in FIG. 26, in place of step S22 in FIG. 23, it is possible to determine whether the value of the key source signal Km at a pixel position is zero (step S31) and to proceed to step S23 when the value is zero or proceed to step S24 when the value is nonzero (the processing in step S21 and in steps S23 to S25 is the same as in FIG. 23).

Since the value zero will be written into the entire storage region of the frame memory 8 during the first write when the key fill signals and key source signals for the three foreground images shown in FIGS. 24 and 25 are written by carrying out the keying write process in FIG. 26, the processing will always proceed from step S31 in FIG. 26 to step S23, and the written result will be the same as the left parts of FIGS. 24B and 25B.

During the second write, the value zero will remain written in the storage regions of the frame memory 8 corresponding to pixel positions aside from the pixel positions of the picture of the sun. Accordingly, the processing will proceed to step S23 in FIG. 26 for the pixel positions aside from the pixel positions of the picture of the sun and will proceed to step S24 in FIG. 26 for the pixel positions of the picture of the sun. After this, the written result will be the same as the left parts of FIG. 24C and FIG. 25C.

During the third write, the value zero will remain written in the storage regions of the frame memory 8 corresponding to pixel positions aside from the pixel positions of the picture of the sun and the characters showing the date surrounded by a frame. Accordingly, the processing will proceed to step S23 in FIG. 26 for the pixel positions aside from the pixel positions of the picture of the sun and the characters showing the date surrounded by a frame and will proceed to step S24 in FIG. 26 for the pixel positions of the picture of the sun and the characters showing the date surrounded by a frame. After this, the written result will be the same as the left parts of FIG. 24D and FIG. 25D.

Accordingly, when the key fill signals and the key source signals for the three foreground images shown in FIGS. 24A to 24D and 25A to 25D are written, the same written result can be obtained when the keying write process shown in FIG. 26 is carried out in place of the keying write process shown in FIG. 23.

It should be understood by those skilled in the art that various modifications, combinations, sub-combinations and alterations may occur depending on design requirements and other factors insofar as they are within the scope of the appended claims or the equivalents thereof.

What is claimed is:

1. An image synthesizing apparatus comprising:
   key image selecting means for selecting an image signal to be used for keying out of image signals inputted on a plurality of input lines;
   background selecting means for selecting a background image;
   key processing means for processing the image signal selected by the key image selecting means;
   image synthesizing means for superimposing a foreground image onto the background image selected by the background selecting means using the image signal processed by the key processing means;
   a frame memory;
   part designating means for individually designating regions that are parts of a screen; and
   writing means for carrying out a write in a storage region corresponding to a region of the screen that has been designated by the part designating means out of storage regions of the frame memory, wherein
   the image signal that has been selected by the key image selecting means is sent to the key processing means,
   the image signal that has been processed by the key processing means is sent to the writing means and written into the frame memory, and
   image signals read from every storage region of the frame memory are sent to the image synthesizing means.

2. An image synthesizing apparatus according to claim 1, wherein
   the part designating means includes an operating unit for designating at least one region from a screen that has been divided in advance into a plurality of regions.

3. An image synthesizing apparatus according to claim 2, wherein
   the operating unit is a graphical user interface where a graphic of a screen that has been divided into the plurality of regions is displayed, at least one region of the graphic is designated, and a display state of the designated at least one region is changed.

4. An image synthesizing apparatus according to claim 3, wherein
   the graphical user interface changes a display state of regions, out of the plurality of regions on the graphic, for which a write into the frame memory has been carried out, displays a clear button for clearing the regions for which a write into the frame memory has been carried out, and restores a display state of the regions cleared by the clear button to a same state as a region yet to be designated, and
   the writing means writes a signal with a value zero into storage regions, out of the storage regions of the frame memory, that correspond to the regions that have been cleared by the clear button.

5. An image synthesizing apparatus according to claim 1, further comprising
operating means for selecting and designating one write type out of a temporary write and a continuous write,
wherein the writing means is operable when the temporary write has been designated to carry out a write for only one frame into the frame memory and when the continuous write has been designated to carry out a write for every frame into the frame memory.

6. An image synthesizing apparatus according to claim 1, further comprising:
register operating means for registering a plurality of correspondences between an input line selected out of the plurality of input lines by the key image selecting means and a region designated by the part designating means for an image signal inputted on the selected input line;
cyclical updating means for cyclically repeating the plurality of correspondences registered by the register operating means to update a stored content of the frame memory; and
control means operable, when the register operating means is operated, to store information showing a correspondence between the input line presently selected by the key image selecting means and the region designated by the part designating means for the image signal inputted on the selected input line in a storing means, and operable, when the cyclical updating means is operated, to carry out control to cyclically read one piece of information at a time from the storing means, to control the key image selecting means to select the image signal inputted on the input line indicated by the read information, and to control the writing means to carry out a write into a storage region corresponding to the region indicated by the read information.

7. An image synthesizing apparatus according to claim 1, further comprising
control means for illuminating, out of key selecting buttons that are used to operate the key image selecting means and include buttons that one-to-one correspond to the plurality of input lines, every button that has selected an image signal presently being written into the frame memory.

8. An image synthesizing apparatus according to claim 1, further comprising
an output terminal for outputting image signals read from every storage region of the frame memory.

9. An image synthesizing apparatus according to claim 1, further comprising:
register operating means for registering a correspondence between an input line selected out of the plurality of input lines by the key image selecting means and a storage region, out of storage regions of the frame memory, into which an image signal inputted on the selected input line has been written;
recreate operating means for recreating the correspondence registered by the register operating means; and
control means operable, when the register operating means is operated, to store information showing a correspondence between the input line presently selected by the key image selecting means and the storage region out of the plurality of the storage regions in the frame memory into which the image signal inputted on the selected input line has been written, and operable, when the recreate operating means has been operated and an input line has been selected by the key image selecting means, to control the writing means to carry out a write into a storage region out of the storage regions of the frame memory, that corresponds to the selected input line indicated in the information stored in the storing means.

10. An image synthesizing apparatus according to claim 1, further comprising:
storing means for transferring and storing image signals written in every storage region of the frame memory;
transfer operating means for designating a transfer to the storing means;
load operating means for loading an image signal in the storing means into the frame memory; and
control means operable, when the transfer operating means has been operated, to transfer and store image signals written in every storage region of the frame memory to the storing means and operable, when the load operating means has been operated, to load an image signal in the storing means into the frame memory.

11. An image synthesizing apparatus comprising:
key image selecting means for selecting a key fill signal and a key source signal;
background selecting means for selecting a background image;
key processing means for processing the key fill signal and the key source signal selected by the key image selecting means;
image synthesizing means for superimposing the key fill signal processed by the key processing means as a foreground image onto the background image selected by the background selecting means using the key source signal processed by the key processing means as key values;
a first frame memory used for key fill signals;
a second frame memory used for key source signals; and
synthesizing writing means, wherein
the key fill signal and the key source signal that have been selected by the key image selecting means are sent to the key processing means,
the key fill signal and the key source signal that have been processed by the key processing means are sent to the synthesizing writing means,
the synthesizing writing means writes, out of the key fill signal and the key source signal from the key processing means, only signals for pixel positions where a value of the key source signal is nonzero respectively into storage regions, out of storage regions of the first frame memory and the second frame memory, that correspond to the pixel positions, and
signals that have been read from every storage region of the first frame memory and the second frame memory are sent to the image synthesizing means.

12. An image synthesizing apparatus comprising:
key image selecting means for selecting a key fill signal and a key source signal;
background selecting means for selecting a background image;
key processing means for processing the key fill signal and the key source signal selected by the key image selecting means;
image synthesizing means for superimposing the key fill signal processed by the key processing means as a foreground image onto the background image selected by the background selecting means using the key source signal processed by the key processing means as key values;
a first frame memory used for key fill signals;
a second frame memory used for key source signals; and
synthesizing writing means, wherein the key fill signal and the key source signal that have been selected by the key image selecting means are sent to the key processing means, the key fill signal and the key source signal that have been processed by the key processing means are sent to the synthesizing writing means, the synthesizing writing means writes, out of the key fill signal and the key source signal from the key processing means, only signals for pixel positions corresponding to storage regions where nonzero values are stored in the second frame memory respectively into storage regions, out of the storage regions of the first frame memory and the second frame memory, that correspond to the pixel positions, and signals that have been read from every storage region of the first frame memory and the second frame memory are sent to the image synthesizing means.

13. An image synthesizing apparatus comprising:
a key image selector configured to select an image signal to be used for keying out of image signals inputted on a plurality of input lines;
a background selector configured to select a background image;
a key processor configured to process the image signal selected by the key image selector;
an image synthesizer configured to superimpose a foreground image onto the background image selected by the background selector using the image signal processed by the key processor;
a frame memory;
a part designator configured to individually designate regions that are parts of a screen; and
a writing device configured to carry out a write in a storage region corresponding to a region of the screen that has been designated by the part designator out of storage regions of the frame memory, wherein
the image signal that has been selected by the key image selector is sent to the key processor,
the image signal that has been processed by the key processor is sent to the writing device and written into the frame memory, and
image signals read from every storage region of the frame memory are sent to the image synthesizer.

14. An image synthesizing apparatus comprising:
a key image selector configured to select a key fill signal and a key source signal;
a background selector configured to select a background image;
a key processor configured to process the key fill signal and the key source signal selected by the key image selector;
an image synthesizer configured to superimpose the key fill signal processed by the key processor as a foreground image onto the background image selected by the background selector using the key source signal processed by the key processor as key values;
a first frame memory used for key fill signals;
a second frame memory used for key source signals; and
a synthesizing writing device, wherein
the key fill signal and the key source signal that have been selected by the key image selector are sent to the key processor,
the key fill signal and the key source signal that have been processed by the key processor are sent to the synthesizing writing device,
the synthesizing writing device writes, out of the key fill signal and the key source signal from the key processor, only signals for pixel positions where a value of the key source signal is nonzero respectively into storage regions, out of storage regions of the first frame memory and the second frame memory, that correspond to the pixel positions, and
signals that have been read from every storage region of the first frame memory and the second frame memory are sent to the image synthesizer.

15. An image synthesizing apparatus comprising:
a key image selector configured to select a key fill signal and a key source signal;
a background selector configured to select a background image;
a key processor configured to process the key fill signal and the key source signal selected by the key image selector;
an image synthesizer configured to superimpose the key fill signal processed by the key processor as a foreground image onto the background image selected by the background selector using the key source signal processed by the key processor as key values;
a first frame memory used for key fill signals;
a second frame memory used for key source signals; and
a synthesizing writing device, wherein
the key fill signal and the key source signal that have been selected by the key image selector are sent to the key processor,
the key fill signal and the key source signal that have been processed by the key processor are sent to the synthesizing writing device,
the synthesizing writing device writes, out of the key fill signal and the key source signal from the key processor, only signals for pixel positions corresponding to storage regions where nonzero values are stored in the second frame memory respectively into storage regions, out of the storage regions of the first frame memory and the second frame memory, that correspond to the pixel positions, and
signals that have been read from every storage region of the first frame memory and the second frame memory are sent to the image synthesizer.

* * * * *